United States Patent [19]

Ozawa et al.

[11] Patent Number: 5,785,491
[45] Date of Patent: Jul. 28, 1998

[54] LIQUID PUMP HAVING A DRIVING UNIT AND A DRIVEN UNIT WITH A RESILIENT SEAL THEREBETWEEN

[75] Inventors: Yasuo Ozawa, Kariya; Mitsutoshi Hagiwara, Anjyo; Itsuro Hashiguchi, Toyota, all of Japan

[73] Assignee: Aisin Seiki Kabushiki Kaisha, Aichi-pref, Japan

[21] Appl. No.: 673,112

[22] Filed: Jul. 1, 1996

[30] Foreign Application Priority Data

Jun. 29, 1995 [JP] Japan ................................. 7-164152
Feb. 29, 1996 [JP] Japan ................................. 8-042849

[51] Int. Cl.⁶ ................................................. F01D 23/00
[52] U.S. Cl. ........................... 415/70; 415/111; 415/113; 415/168.2; 415/174.2; 415/231
[58] Field of Search ................................. 415/111, 113, 415/168.2, 70, 174.2, 180, 231

[56] References Cited

U.S. PATENT DOCUMENTS

| 1,527,474 | 2/1925 | Faure | 415/70 |
| 2,065,834 | 12/1936 | Swennes | 415/70 |
| 2,107,090 | 2/1938 | Swennes | 415/70 |
| 2,759,427 | 8/1956 | Holstein | 415/70 |
| 2,773,453 | 12/1956 | Gemeinhardt | 415/70 |
| 2,837,926 | 6/1958 | Korsgren, Sr. et al. | |
| 2,862,451 | 12/1958 | Holstein | |
| 3,293,926 | 12/1966 | Woellmer | |
| 3,702,938 | 11/1972 | Garnier | 415/70 |
| 4,216,677 | 8/1980 | Tuzon | |
| 4,403,521 | 9/1983 | f'Geppert | |

FOREIGN PATENT DOCUMENTS

| 2208009 | 8/1973 | Germany | 415/70 |
| 314849 | 2/1934 | Italy | 415/70 |
| 63-189690 | 8/1988 | Japan | |
| 3-8696 | 1/1991 | Japan | |
| WO 91/16559 | 10/1991 | WIPO | |

Primary Examiner—Thomas E. Denion
Attorney, Agent, or Firm—Hazel & Thomas, P.C.

[57] ABSTRACT

A liquid pump in which a perfect seal is achieved between a liquid and the atmosphere without the use of magnets includes a pump shaft rotatably supported inside housings and having an impeller secured thereto for impelling a liquid through the pump, a driven unit provided inside the housing for rotating the pump shaft, a driving unit coupled to external power, and a resilient member provided between the driven unit and the driving unit for effecting sealing liquid-tightly between the driven unit and the driving unit on the side of the impeller and transmitting force from the driving unit to the driven unit.

28 Claims, 16 Drawing Sheets

LIQUID PUMP HAVING A DRIVING UNIT AND A DRIVEN UNIT WITH A RESILIENT SEAL THEREBETWEEN

BACKGROUND OF THE INVENTION

This invention relates to a liquid pump such as a water pump for forcibly circulating a liquid such as water or an antifreeze solution such as LLC (long life coolant). More particularly, the present invention pertains to a liquid pump which can advantageously be used circulating engine cooling water through an engine cooling system, but the present invention is not limited to a water pump for such a use.

Conventionally, a water pump for use in an engine cooling system has an impeller shaft driven by the engine or by a motor so as to rotate an impeller disposed in the water. One end of the shaft is exposed to the atmosphere in order to receive the externally applied drive, and the other end of the shaft extends into the liquid to drive the impeller. In order to prevent the leakage of water from between these two ends, the pump is sealed using a mechanical seal having a high mechanical sealing capability. However, there are instances where foreign matter contained in the water has an adverse effect upon the seal, in which case there is the danger that seal effectiveness will not be stably maintained over an extended period of time. Further, it has been recognized that a mechanical seal may sometimes produce a squeaking noise in operation because of a slipping movements of the seal. Efforts have hithertofore been made for solving the problem.

Accordingly, as disclosed in the specifications of Japanese Utility Model Application Laid-Open (KOKAI) No. Hei 3-8696(1991) and Japanese Patent Application Laid-Open (KOKAI) No. Sho 63-189690(1988), a mechanism has been developed which isolates the water from the atmosphere by coupling using magnetic force, with only rotating force being transmitted.

With this liquid pump according to the prior art, however, the fact that magnetic force is used means that the pump cannot follow up sudden changes in rotational torque. In addition, since a number of magnets must be used, the cost is high and the pump is comparatively large in size.

SUMMARY OF THE INVENTION

Accordingly, an object of the present invention is to provide a liquid pump in which a perfect seal can be provided between the liquid and the atmosphere without relying upon magnets.

According to the present invention, the foregoing object is attained by providing a liquid pump comprising a housing adapted to be secured on a stationary member, a pump shaft rotatably supported inside the housing and having an impeller secured thereto for impelling a liquid through the pump, a driven unit provided inside the housing for rotating the pump shaft, a driving unit coupled to external power, and a resilient member provided between the driven unit and the driving unit for effecting sealing liquid-tightly between the driven unit and the driving unit on the side of the impeller and transmitting force from the driving unit to the driven unit.

The driving unit is rotated by externally applied power, whereupon force is transferred to the driven unit via the resilient member. The driven unit rotates the pump shaft. As a result, water is impelled through the pump so that a pumping function is performed. Since the resilient member is provided between the driven unit and the driving unit, sealing is effected liquid-tightly on the side of the driven unit. This prevents the liquid from leaking to the side on which the driving unit is located.

In an embodiment, the driven unit comprises a driven cam secured to the pump shaft eccentrically, and the driving unit comprises a pulley rotated by external power and having an inner peripheral side portion provided with an eccentric groove corresponding to an outer periphery of the driven cam, and the resilient member is provided between the driven cam and the inner peripheral side portion of the pulley, thereby effecting sealing liquid-tightly on the side of the driven cam internally of the housing.

When the pulley is rotated by external power, its eccentric groove revolves. As a result, the driven cam revolves in accordance with the motion of the eccentric groove. Since the driven cam is placed at a position at which it is offset with respect to the pump shaft, the revolution of the driven cam causes the pump shaft to rotate, thereby impelling the liquid through the pump. The resilient member effects sealing liquid-tightly on the side of the driven cam internally of the housing while sliding between the driven cam and the eccentric groove of the pulley. This prevents the liquid from leaking to the side on which the driving unit is located.

In the above embodiment, the driven cam comprises a semi-circular cam.

Since the driven cam is a semi-circular cam, the liquid is capable of flowing by the inner side of the driven cam. As a result, the driven cam and the resilient member are cooled, thereby absorbing the heat produced by sliding between the resilient member and the driven cam and sliding between the resilient member and the eccentric groove.

In the above embodiment, a liquid passageway is provided within the driven cam.

Since a liquid passageway is provided within the driven cam, the liquid is capable of flowing by the inner side of the driven cam. As a result, the driven cam and the resilient member are cooled, thereby absorbing the heat produced by sliding between the resilient member and the driven cam and sliding between the resilient member and the eccentric groove.

In the above embodiment, the liquid passageway is inclined.

Since the liquid passageway is inclined, the liquid inside the liquid passageway flows in the axial direction owing to rotation of the driven cam, thereby enhancing the cooling effect.

The pump shaft is provided with a cylindrical reduced-diameter portion to which the impeller is secured, the driven unit is provided with a cylindrical cam portion eccentrically disposed with respect to the reduced-diameter portion, the reduced-diameter portion and cam portion having hollow interiors that are in communication with each other, the housing is provided with a flange so as to separate the housing into a side on which the impeller is disposed and a side on which the cam portion is disposed, and with a bearing, which is attached to the flange, for supporting the reduced-diameter portion of the pump shaft so as to be rotatable relative to the housing, the driving unit comprises a pulley rotated by external power and having an inner peripheral side provided with an eccentric groove corresponding to an outer periphery of the driven cam, the driven unit is provided with a sleeve-shaped cap disposed between the cam portion and the eccentric groove of the pulley, the resilient member is provided between the cap and the housing, thereby effecting sealing liquid-tightly on the side of the pump internally of the housing, and the flange of the housing is provided with a hole communicating the side on which the impeller is disposed and the side on which the cam portion is disposed.

When the pulley is rotated by external power, its eccentric groove revolves. As a result, the cap revolves in accordance with the motion of the eccentric groove. Since the resilient member is provided between the cap and the flange of the housing, the cap only revolves and does not rotate. Since the cam portion fits into the cap, the cam portion moves in conformity with the revolution of the cap. Owing to the fact that the reduced-diameter portion is supported by the bearing, the cam portion revolves while it rotates, and the reduced-diameter portion rotates as the cam portion performs this motion. Accordingly, the pump shaft rotates about the reduced-diameter portion and impels the liquid through the pump. Owing to the presence of the resilient member and cap, sealing is effected liquid-tightly on the side of the pump shaft internally of the housing so that no liquid leaks to the side of the driving unit. Though the cap slides between the eccentric groove and the cam portion, the liquid in the chamber in which the impeller is located flows through the hole provided in the flange, the gap between the cap and the cam portion, the inner side of the cam portion and the inner side of the reduced-diameter portion in the order mentioned or in the reverse of this order, thereby cooling the sliding portions.

In another embodiment, the pump shaft is provided with a cylindrical reduced-diameter portion, to which the impeller is secured, supported by a bearing that is supported on the housing, the driven unit comprises a cylindrical cam eccentrically disposed with respect to the reduced-diameter portion and a cap provided with an eccentric groove, which corresponds to an outer periphery of the cylindrical cam, and an eccentric shaft coaxial with the eccentric groove, the reduced-diameter portion and cylindrical cam having hollow interiors that are in communication with each other, the driving unit comprises a pulley rotated by external power and having an eccentric groove corresponding to the eccentric shaft of the cap, and the resilient member is provided between the cap and the housing, thereby effecting sealing liquid-tightly on the side of the pump internally of the housing.

When the pulley is rotated by external power, its eccentric groove revolves. As a result, the eccentric shaft of the cap revolves in conformity with the motion of the eccentric groove. Since the resilient member is provided between the cap and the flange of the housing, the eccentric groove of the cap only revolves and does not rotate. Since the cylindrical cam fits into the annular groove of the cap, the cylindrical cam moves in conformity with the revolution of the eccentric groove of the cap. Owing to the fact that the reduced-diameter portion is supported by the bearing, the cylindrical cam revolves while it rotates, and the reduced-diameter portion rotates as the cylindrical cam performs this motion. Accordingly, the pump shaft rotates about the reduced-diameter portion and impels the liquid through the pump. Owing to the presence of the resilient member and cap, sealing is effected liquid-tightly on the side of the pump shaft internally of the housing so that no liquid leaks to the side of the driving unit. Though the cap slides between the eccentric groove and the cam portion, the liquid in the chamber in which the impeller is located flows through the hole provided in the flange, the gap between the cap and the cylindrical cam, the inner side of the cylindrical cam and the inner side of the reduced-diameter portion in the order mentioned or in the reverse of this order, thereby cooling the sliding portions.

In the above embodiment, the cylindrical cam has the shape of a semicircular cylinder.

Since the cylindrical cam has the shape of a semi-circular cylinder, the gap between the cap and the cylindrical cam is enlarged to enhance the cooling effect.

In the above embodiment, the cap has an end portion provided with a cylindrically shaped groove of a size made to conform to a locus defined by a point on the cap when the cap revolves, and the cylindrical housing is provided with a rod-shaped portion extending into the cylindrically shaped groove.

The movement of the cap is limited by the interaction between the rod-shaped portion and the cylindrically shaped groove the size whereof conforms to the locus defined by a point on the cap when the cap revolves. This makes it impossible for the cap to rotate. As a result, less torsion acts upon the resilient member.

In another embodiment, the pump shaft is formed to have a cylindrical shape, the driven unit is provided with a columnar eccentric cam secured eccentrically to the pump shaft and having an axially extending through-hole, the housing is provided with a flange so as to separate the housing into a side on which the impeller is disposed and a side on which the eccentric cam is disposed, and with a bearing, which is attached to the flange, for supporting the pump shaft so as to be rotatable relative to the housing, the driving unit comprises a pulley rotated by external power and having an inner peripheral side provided with an eccentric groove corresponding to an outer periphery of the eccentric cam, the driven unit is provided with a sleeve-shaped cap disposed between the eccentric cam and the eccentric groove of the pulley, the resilient member is provided between the cap and the housing, thereby effecting sealing liquid-tightly on the side of the pump shaft internally of the housing, and the flange of the housing is provided with a hole communicating the side on which the impeller is disposed and the side on which the cam is disposed.

When the pulley is rotated by external power, the eccentric groove revolves. As a result, the cap revolves in conformity with the motion of the eccentric groove. Since the resilient member is provided between the cap and the flange of the housing, the cap only revolves and does not rotate. Since the eccentric cam fits into the cap, the eccentric cam moves in conformity with the revolution of the cap. Owing to the fact that the pump shaft is supported by the bearing, the eccentric cam revolves while it rotates, and the pump shafts rotates as the eccentric cam performs this motion, thereby impelling the liquid through the pump. Owing to the presence of the resilient member and cap, sealing is effected liquid-tightly on the side of the pump shaft internally of the housing so that no liquid leaks to the side of the driving unit. Though the cap slides between the eccentric groove and the cam, the liquid in the chamber in which the impeller is located flows through the hole provided in the flange, the gap between the cap and the cam, the inner side of the cam and the inner side of the pump shaft in the order mentioned or in the reverse of this order, thereby cooling the sliding portions. The pump is made more compact since the eccentric groove is provided on the inner peripheral side of the pulley.

In another embodiment, the driven unit comprises an eccentric, columnar driven cam secured to the pump shaft, the driving unit comprises an eccentric, columnar driving cam rotated by external power, and the resilient member is provided between the driving cam and the driven cam, thereby effecting sealing liquid-tightly on the side of the driven cam internally of the housing.

When the driving cam is rotated by external power, the driven cam rotates in conformity with the rotation of the driving cam via the resilient member. As a result, the pump shaft rotates and impels the liquid through the pump. The driving cam and driven cam rotate while sliding on the surface of the resilient member. Further, the resilient member effects sealing liquid-tightly on the side of the driven cam inwardly of the housing so that no liquid leaks to the side of the driving unit.

In the above embodiment, biasing means is provided between the housing and the driven cam for biasing the driven cam toward the driving cam.

The biasing means, which is disposed between the housing and the driven cam, urges the driven cam into contact with the driving cam at all times. As a result, the driven cam rotates smoothly in conformity with the movement of the driving cam.

In the above embodiment, the resilient member is provided with a wear-resistant plate at surfaces of contact between the driven cam and the driving cam.

A plate having an excellent resistance to wear is provided on the resilient member at the surfaces of contact between the driven cam and driving cam. As a result, the driving cam and driven cam rotate smoothly so that the rotational driving force of the driving cam and the rotational driving force of the driven cam that act upon the resilient member can be reduced.

In the above embodiment, the plate is molded as an integral part of the resilient member.

Since the plate is formed as an integral part of the resilient member, the pump can be sealed perfectly against leakage of the liquid.

In another embodiment, the driven unit comprises a crank secured to the pump shaft and a connecting rod supported on the crank, the driving unit comprises an eccentric columnar driving cam rotated by external force, and the resilient member is provided between the driving cam and the connecting rod, thereby effecting sealing on the side of the connecting rod internally of the housing.

When the driving cam is rotated by external power, the connecting rod is pushed via the resilient member, thereby rotating the crank. Accordingly, the pump shaft is rotated and impels the liquid through the pump. The driving cam rotates while sliding on the surface of the resilient member. In addition, since the resilient member liquid-tightly seals the side of the driven cam inwardly of the housing, no liquid leaks to the side of the driving unit.

In the above embodiment, the resilient member is provided with a wear-resistant plate at surfaces of contact between the connecting rod and the driving cam.

The plate exhibiting excellent wear resistance is provided on the resilient member at the surfaces of contact between the connecting rod and driving cam. As a result, the driving cam and connecting rod rotate smoothly so that the rotational driving force of the driving cam acting upon the resilient member can be reduced.

In the above embodiment, the plate is molded as an integral part of the resilient member.

Since the plate is formed as an integral part of the resilient member, the pump can be sealed perfectly against leakage of the liquid.

A plurality of each of the cranks, connecting rods and driving cams, successively offset in terms of phase, are provided.

A plurality of the cranks, connecting rods and driving cams are provided. The cranks are successively offset in terms of phase, as are the connecting rods and driving cams. As a result, pump shaft rotates smoothly.

In an embodiment, the driven unit is constituted by an inclined surface formed at one end of the pump shaft, a drive shaft, one end of which is formed to have an inclined surface, and which is rotated by external power, is provided as the driving unit, and the resilient member is provided between the inclined surface of the drive shaft and the inclined surface of the pump shaft, thereby effecting sealing liquid-tightly on the side of the pump shaft internally of the housing.

When the drive shaft is rotated by external power, the inclined surface of the pump shaft moves in conformity with movement of the inclined surface of the drive shaft, as a result of which the pump shaft rotates. The resilient member slides between these two inclined surfaces. Since the resilient member liquid-tightly seals the side of the pump shaft inwardly of the housing, no liquid leaks to the side of the driving unit.

In an embodiment, the driving unit comprises a drive shaft rotated by external power in coaxial relation to the pump shaft and having an eccentric groove eccentrically disposed with respect to the pump shaft, the driven unit comprises an outer peripheral surface of one end of the pump shaft, and a cylindrical cap having an outer peripheral surface rotatably fitted into the eccentric groove of the drive shaft and an inner peripheral surface contacting the outer peripheral surface of the pump shaft, and the resilient member is provided between the cylindrical cap and the housing, thereby effecting sealing liquid-tightly on the side of the pump shaft internally of the housing.

When the drive shaft is rotated by external power, its eccentric groove revolves. As a result, the cylindrical cap revolves in accordance with the motion of the eccentric groove. Since the resilient member is provided between the cylindrical cap and the housing, the cylindrical cap only revolves and does not rotate. A frictional force from the inner side of the cylindrical cap acts upon the outer peripheral surface of the pump shaft so that the pump shaft is rotated relative to the cylindrical cap. Liquid is impelled through the pump owing to this rotation of the pump shaft. Owing to the presence of the resilient member and cap, sealing is effected liquid-tightly on the side of the pump shaft internally of the housing so that no liquid leaks to the side of the driving unit. Sliding takes place between the cylindrical cap and the eccentric groove.

The inner peripheral surface of the cylindrical cap is provided with a first gear, and the outer peripheral surface of the pump shaft is provided with a second gear, the first and second gears meshing with each other.

Since the meshing gears are provided on the inner peripheral surface of the cylindrical and the outer peripheral surface of the pump shaft, revolution of the cylindrical cap can readily be converted to rotation of the pump shaft.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

A first embodiment of the present invention will now be described.

Figure 1:
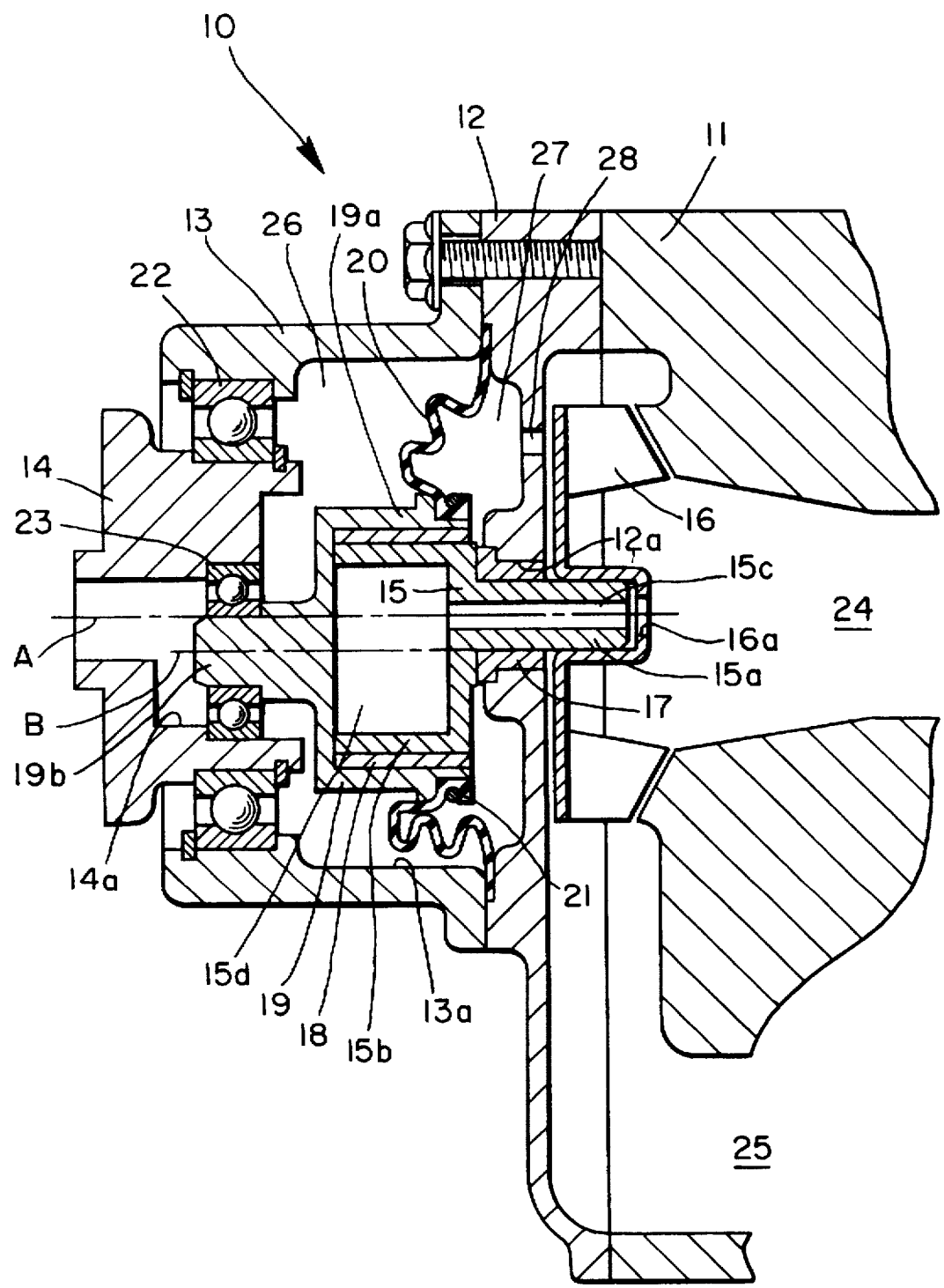
FIG. 1 is a sectional view illustrating a liquid pump according to a first embodiment of the present invention.

A liquid pump 10 according to this embodiment has a housing 12 adapted to be secured to an cylinder block 11 by bolts (not shown) and a cylindrical housing 13 secured liquid-tightly to the housing 12 by an outwardly extending flange to define one open end of its bore 13a. The housing 12 has a radially inwardly extending flange provided with a hole 12a which is coaxial with the bore 13a of the housing 13. A submerged sliding bearing 17 made of e.g. a phenolic resin is press fitted in the hole 12a and has a bore in which a cylindrical reduced-diameter portion 15a formed on one end of a pump shaft 15 is supported so as to be rotatable about a line A. An impeller 16 is press fitted about the end of the reduced-diameter portion 15a, and is rotatable with the pump shaft 15 to direct a liquid from an intake port 24 to a discharge port 25. The impeller 16 has a communicating hole 16a which communicates the bore 15c of the reduced-diameter portion 15a of the pump shaft 15 with the intake port 24. The pump shaft 15 has a cylindrical cam portion 15b formed toward the other end thereof situated in the bore 13a of the housing 13. The cam portion 13 has a cylindrical shape centered on a line B which is eccentric relative to the line A. A cylindrical projecting portion is formed on a side surface of the cam portion 15b which is opposite to the flange of the housing 12, and is contacted with a flange portion which is formed on the left side end of the submerged sliding bearing 17 in FIG. 1. A driving unit 14 is supported in the other open end of the bore 13a of the housing 13 via a rolling bearing 22 so as to be rotatable about the line A. A circular eccentric groove 14a centered on the line B is formed on the driving unit 14. An axis portion 19b of a cap 19 which is extending leftwardly and which is centered on the line B is supported within the eccentric groove 14a via a rolling bearing 23. The rolling bearing 23 is in the same axial position with the rolling bearing 22. A cylindrical portion 19a which has a cup-shaped configuration or a sleeve-shaped configuration that is open on its right-hand side is formed on the right end of the cap 19 in FIG. 1. The cylindrical portion 19a is centered on the line B and its inner side retains a submerged sliding bearing 18 made of e.g. a phenolic resin by which the cam portion 15b of the pump shaft 15. The submerged sliding bearing 18 is press fitted into the cylindrical portion 19a of the cap 19 (Now, it is possible to press fit the submerged sliding bearing 18 on the cam portion 15b). The cap 19 corresponds to a driven unit of the present invention. In FIG. 1, the axial center of the eccentric groove 14a, the axial center of the axis portion 19b, the axial center of the cylindrical portion 19a, the axial center of the cam portion 15b and the reduced-diameter portion 15a are positioned on the line B. A pulley (not shown) is secured to the driving unit 14, and the power of an engine is transmitted by power transmitting means, such as a belt, to the pulley at its belt receiving portion. The belt receiving portion of the pulley (not shown) has a belt center which is axially aligned with the rolling plane of the rolling bearing 22, so that no unbalanced load may not act upon the rolling bearing 22.

An annular bellows (diaphragm) 20 having a plurality of folds and defining a resilient member in the context of the present invention has an inner end fastened liquid-tightly by a ring member 21 to the outer surface of the cylindrical portion 19b of the cap 19. The outer end of the bellows 20 is liquid-tightly held between the mating surfaces of the housings 12, 13. The flange of the housing 12 which is situated behind the impeller 16 has a through hole 28 by which the outer circumferential portion (which communicates with the discharge port) of a pump chamber formed between the housing 12 and the cylinder block 11, and holding the impeller 16 is communicated with a space 27 formed between the flange of the housing 12 and the bellows 20. The hollow interior 15d of the cam portion 15b is communicated with the center portion of the pump chamber (which communicates with the intake port) via the bore of the reduced-diameter portion 15a and the bore 16a of the impeller 16. A space 26 separated from the space 27 by the bellows 20 is filled with air.

In accordance with this arrangement, rotation of the driving unit 14 relative to the housing 13 causes the eccentric groove 14a of the driving unit 14 to rotate about the line A. This is accompanied by movement of the axis portion 19b of the cap 19. Since the cap 19 has its rotation limited by the bellows 20, the cap 19 revolves, which revolution is allowed by the bellows. The cam portion 15b also revolves in accordance with the revolution of the cap 19. Since the reduced-diameter portion 15a is rotatably supported relative to the housing 12, the pump shaft 15 rotates about the line A. As a result, the impeller 16 rotates and impels the liquid at the intake port 24 toward a discharge port 25.

Part of the pressurized liquid is introduced to a space 27, which is defined by the flange on the housing 12 and the bellows 20, through the hole 28. The liquid in the space 27 is introduced into the hollow interior 15d of the cam portion 15b through gaps between the cap 19 and the submerged sliding bearing 18 and cam portion 15b, and the liquid returns to the intake port 24 through the hollow interior 15c of the reduced-diameter portion 15a. As a result, the submerged sliding bearing 18 which slides between the cap 19 and cam portion 15b is cooled so as to remove the heat of friction and is lubricated.

It should be noted that if the impeller 16 is modified to reverse the intake and discharge ports so that the right-hand side (in FIG. 1) is made the discharge port, cooling will take place by flow of the liquid through the hollow interior 15c of the reduced-diameter portion 15a, the hollow interior 15d of the cam portion 15b, the space 27 and the hole 28, in the order mentioned.

Figure 2:
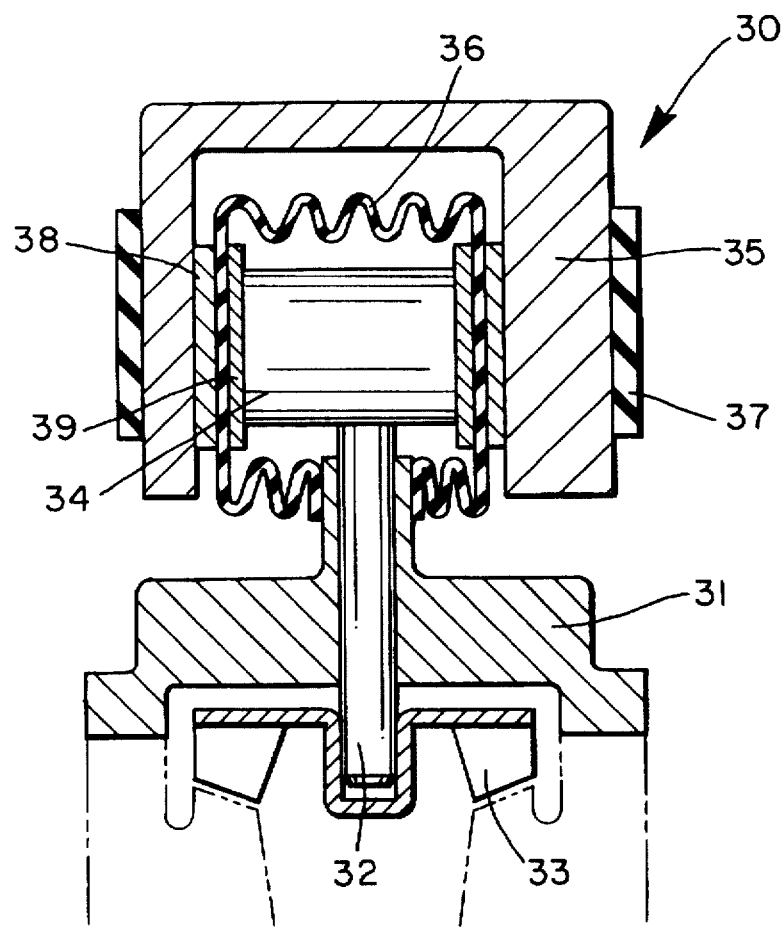
FIG. 2 is a sectional view illustrating a liquid pump according to a second embodiment of the present invention.
Figure 3:
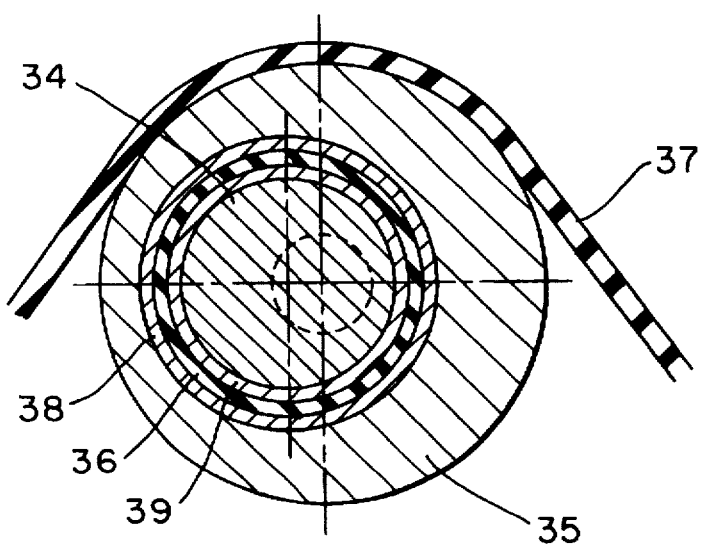
FIG. 3 is a sectional view illustrating the liquid pump according to the second embodiment of the present invention.

A second embodiment of the invention will now be described with reference to FIGS. 2 and 3.

A liquid pump 30 according to the second embodiment has a housing 31 rotatably supporting a pump shaft 32. An impeller 33 and a cylindrical cam 34 are secured to the pump shaft 32. The cylindrical cam 34 is eccentrically disposed with respect to the pump shaft 32. A cylindrical plate 39, a bellows 36 and a cylindrical plate 38 are disposed on the outer periphery of the cylindrical cam 34 in the order mentioned. A cylindrical pulley 35 arranged in coaxial relation to the pump shaft 32 is provided with an eccentric groove in which the plate 38 is fitted. The pulley 35 is rotatively driven by a belt 37. The bellows 36, which comprises a resilient member made of rubber or the like, surrounds the cylindrical cam 34 and plate 39 on its inner side and is liquid-tightly fastened to a housing 31. The plates 38 and 39 can be made of a wear-resistance material. The other components of this liquid pump are similar to those of the first embodiment.

In accordance with this arrangement, the pulley 35 is rotated by a belt 37, which serves as the driving unit, whereupon the eccentric groove of the pulley 35 undergoes circular revolution. This is accompanied by revolution of the plate 38, bellows 36 and plate 39. Since the bellows 36 is secured to the housing 31, the bellows does not rotate and the plate 38 slides between the bellows 36 and eccentric groove. The cylindrical cam 34 rotates in conformity with the motion of the bellows 36 and plate 39. The center of rotation of the cylindrical cam 34 coincides with the center of the pump shaft 32. As a result, the pump shaft 32 rotates and impels the liquid through the pump. Since the bellows 36 surrounds the cylindrical cam 34, no liquid leaks to the side of the pulley 35, which constitutes the driving unit, even if the liquid leaks from between the pump shaft 32 and housing 31.

Figure 4:
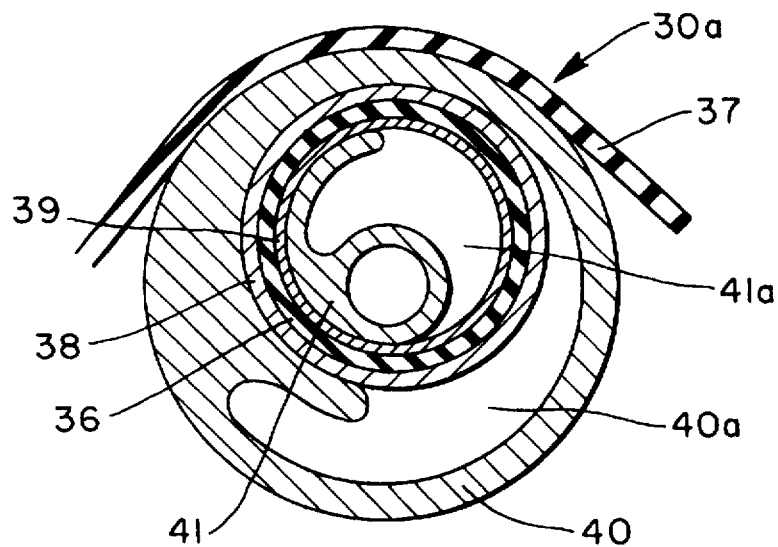
FIG. 4 is a sectional view illustrating a liquid pump according to a third embodiment of the present invention.

A third embodiment of the invention will now be described with reference to FIG. 4.

A liquid pump 30a according to the third embodiment is a modification of the second embodiment and differs from the second embodiment only in terms of the shapes of the cylindrical cam and pulley. Here a cylindrical cam 41 has a semicircular configuration. Further, a space 40a is provided within the pulley 40 and connects with the eccentric groove.

Liquid that has accumulated within the bellows 36 flows through a space 41a, which is formed between the plate 39 and cylindrical cam 41, and effectively absorbs heat of friction produced by the plates 38, 39. In addition, providing the space 40a inside the pulley 40 improves the heat radiating property.

Figure 5:
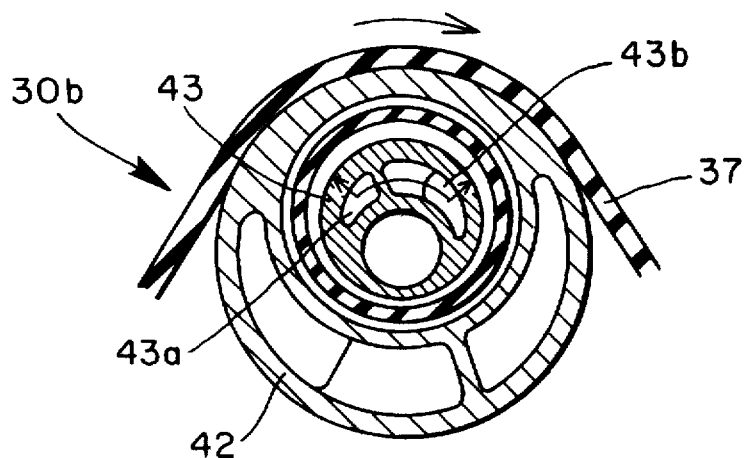
FIG. 5 is a sectional view illustrating a liquid pump according to a fourth embodiment of the present invention.
Figure 6:
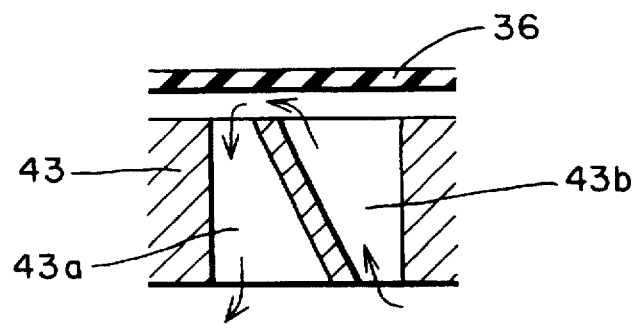
FIG. 6 is a sectional view showing another section of the liquid pump.

A fourth embodiment of the invention is illustrated in FIGS. 5 and 6.

A liquid pump 30b according to the fourth embodiment is a modification of the second embodiment and differs from the second embodiment only in terms of the shapes of the cylindrical cam and pulley. Here a cylindrical cam 43 is provided with inclined liquid passageways 43a and 43b. A pulley 42 also is provided with inclined liquid passageways.

When cylindrical cam 43 rotates, the liquid flows in axially of the cam owing to the inclined surfaces. As a result, the liquid circulates through the interior of the cylindrical cam 43 to enhance the cooling effect. The effect of air cooling is similarly enhanced with regard to the pulley 42.

Figure 7:
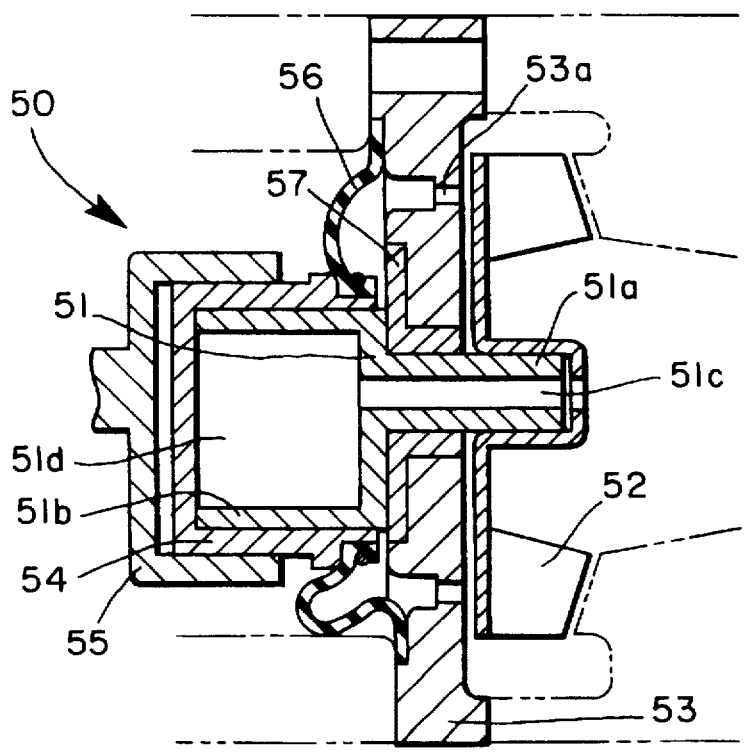
FIG. 7 is a sectional view illustrating a liquid pump according to a fifth embodiment of the present invention.

A fifth embodiment of the invention will be described with reference to FIG. 7.

A liquid pump 50 according to the fifth embodiment has a housing 53 provided with an inwardly extending flange having a hole 53a. The housing 53 rotatably supports a pump shaft 51 inwardly of the flange thereof via a submerged sliding bearing 57. An impeller 52 is secured to the right end (as seen from the viewpoint of FIG. 7) of the pump shaft 51. The pump shaft 51 has a cylindrical reduced-diameter portion 51a and a cylindrical cam portion 51b. The hollow interiors of the reduced-diameter portion 51a and cam portion 51b are in communication. A driving unit 55 receives power from a driving source (not shown) and rotates in coaxial relation to the reduced-diameter portion 51a. The driving unit 55 is formed to have an eccentric groove on the inner side of which a cap 54 is supported. The cap 54 has a sleeve-shaped configuration that is open on its right-hand side in FIG. 7. This opening supports the cam portion 51b on its inner side.

A ring-shaped bellows 56 comprising a resilient member is liquid-tightly fastened to the outer periphery of the cap 54 by a ring. The outer periphery of the bellows 56 is secured to the housing 53.

In accordance with this arrangement, the eccentric groove in the driving unit 44 revolves when the driving unit rotates. This is accompanied by revolution of the cap 54, the rotation of which is checked by the bellows 56. The cam portion 51b also revolves in conformity with the revolution of the cap 54. Since the reduced-diameter portion 51a is rotatably supported relative to the housing 53, the pump shaft 51 rotates, there rotating the impeller so as to impel the liquid through the pump.

Part of the pressurized liquid is introduced to a space, which is defined by the flange on the housing 53 and the bellows 56, through the hole 53a. The liquid in the space is introduced into the hollow interior of the cam portion 51b through a gap between the cap 54 and the cam portion 51b, and the liquid returns to the intake port through the hollow interior of the reduced-diameter portion 51a. As a result, cooling takes place between the cap 54 and cam portion 51b so as to remove the heat of friction.

It should be noted that if the impeller 52 is modified to reverse the intake and discharge ports so that the right-hand side (in FIG. 7) is made the discharge port, cooling will take place by flow of the liquid through the hollow interior of the reduced-diameter portion 51a, the hollow interior of the cam portion 51b, the space on the right-hand side of the bellows 56 and the hole 53a, in the order mentioned.

Figure 8:
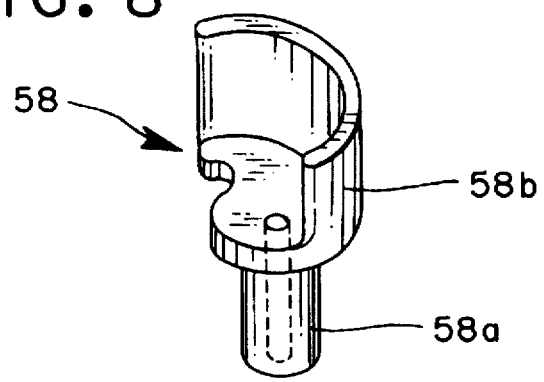
FIG. 8 is a perspective view showing the pump shaft of the liquid pump according to a modification of the fifth embodiment.
Figure 9:
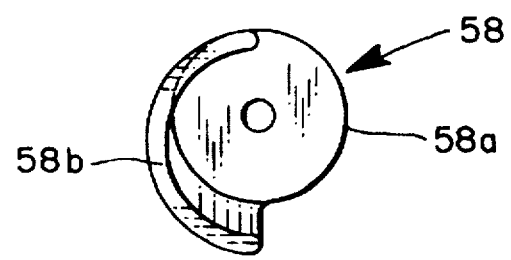
FIG. 9 is a plan view showing the pump shaft of FIG. 8.

FIGS. 8 and 9 illustrate a modification of the fifth embodiment. Here the pump shaft 51 of FIG. 7 is replaced by a pump shaft 58, which has a cam portion 58b defining the shape of a semicircular cylinder. A large quantity of the liquid strikes the inner surface of the cap 54 and the flow of the liquid is facilitated, thereby improving the cooling of the frictionally sliding portions.

Figure 10:
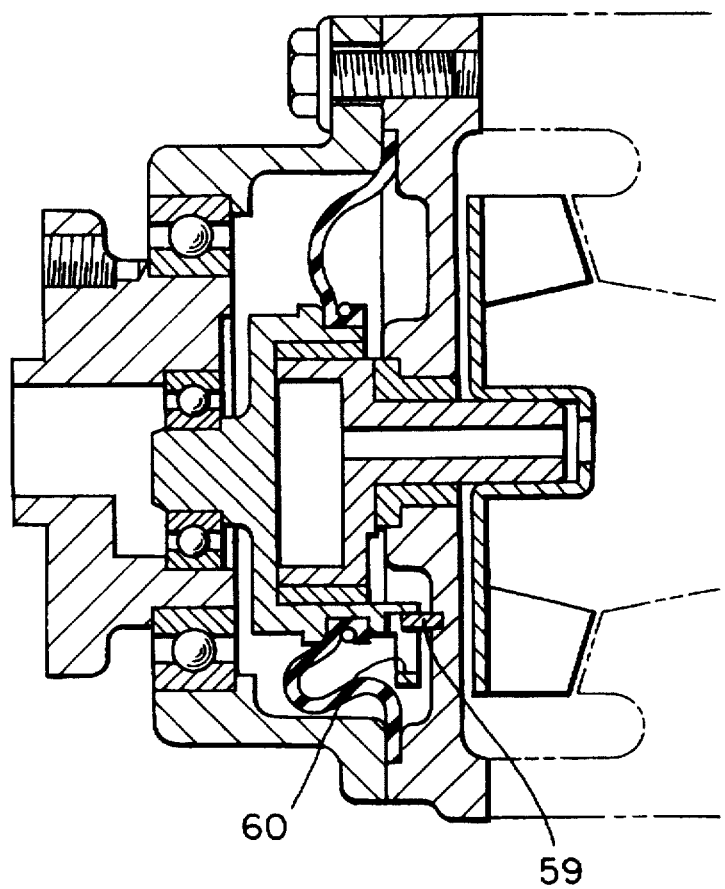
FIG. 10 is a sectional view showing a liquid pump according to a modification of the first embodiment.
Figure 11:
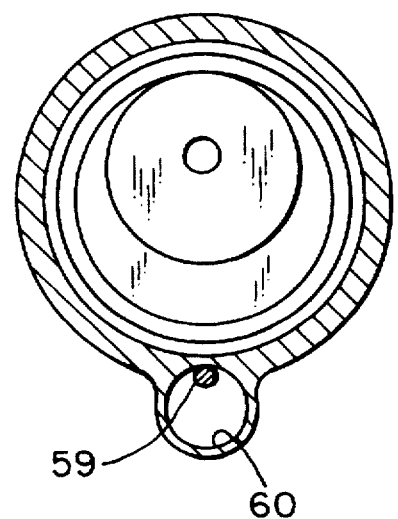
FIG. 11 is a partial sectional view of the liquid pump shown in FIG. 10.

FIGS. 10 and 11 illustrate a modification of the first embodiment. Here the lower right end (in FIG. 10) of the cap 19 is provided with a cylindrical groove 60. The groove 60 is formed to have a size which conforms to a locus defined by a point on the cap 19 when the cap revolves. A rod-shaped portion 59 is secured to the housing 12 and extends into the interior of the groove 60. When the cap 19 revolves, movement thereof is checked by the rod-shaped portion 59 so that the inner peripheral portion of the groove 60 moves along the rod-shaped portion 59. As a result, shearing force acting upon the bellows 20 is reduced to prolong the service life of the bellows 20.

Figure 12:
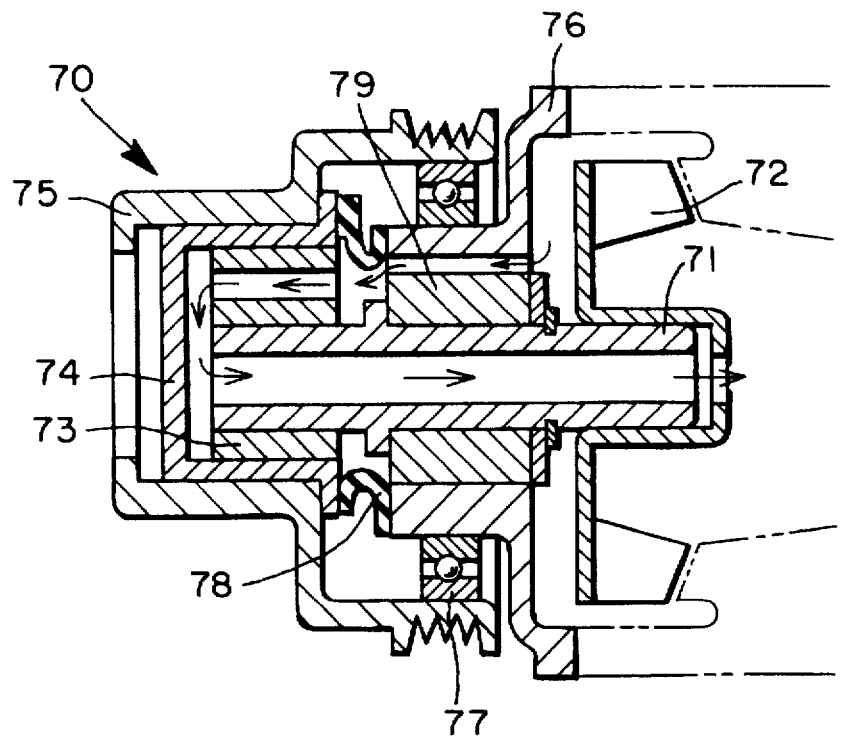
FIG. 12 is a sectional view illustrating a liquid pump according to a sixth embodiment of the present invention.

A sixth embodiment of the invention will now be described with reference to FIG. 12.

Here a liquid pump 70 has a cylindrical housing 76 which rotatably supports a cylindrical pump shaft 71 inwardly of the housing via a submerged sliding bearing 79. An impeller 72 is secured to the right end (as seen from the viewpoint of FIG. 12) of the pump shaft 71. A cylindrical cam 73 is secured to the pump shaft 71 and is eccentrically disposed with respect to the pump shaft 71. The hollow interiors of the pump shaft 71 and cam portion 73 are in communication and communicated with the discharge port provided in the cylinder block. A pulley 75 constituting the driving unit is supported on the outer periphery of the housing 76 via a roller bearing 77 so as to be rotatable in coaxial relation to the pump shaft 71. The left-hand side (in FIG. 12) of the pulley 75 is formed to have a circular eccentric groove on the inner side of which a cap 74 is slidably supported. The cap 74 has a sleeve-shaped configuration that is open on its right-hand side in FIG. 12. This opening slidably supports the cam 73 on its inner side. A ring-shaped bellows 78 comprising a resilient member having a plurality of folds is liquid-tightly fastened between the outer periphery of the cap 74 and the housing 76. The pulley 75 is engaged with a belt (not shown) which transfer the rotation of an engine or the like to the pulley 75. The cam 73 is provided with a hole through which the liquid passes.

In accordance with this arrangement, the eccentric groove of the pulley 75 serving as the driving unit rotates when the pulley rotates relative to the housing 76. This is accompanied by revolution of the cap 74, the rotation of which is checked by the bellows 78. The cam 73 also revolves in conformity with the revolution of the cap 74. Since the pump shaft 71 is rotatably supported relative to the housing 76, the pump shaft 71 rotates, there rotating the impeller 72 so as to impel the liquid at the intake port toward the discharge port.

Part of the pressurized liquid is introduced to the hole, which is provided in the cam 73, through a space defined by the housing 76 and submerged sliding bearing 79, the liquid passes along the bottom of the cap 74 and returns to the intake port through the hollow interior of the pump shaft. As a result, the cap 74 is cooled and the heat of friction is removed.

It should be noted that if the impeller 72 is modified to reverse the intake and discharge ports so that the right-hand side (in FIG. 12) is made the discharge port, the flow of the liquid will be reversed.

Figure 13:
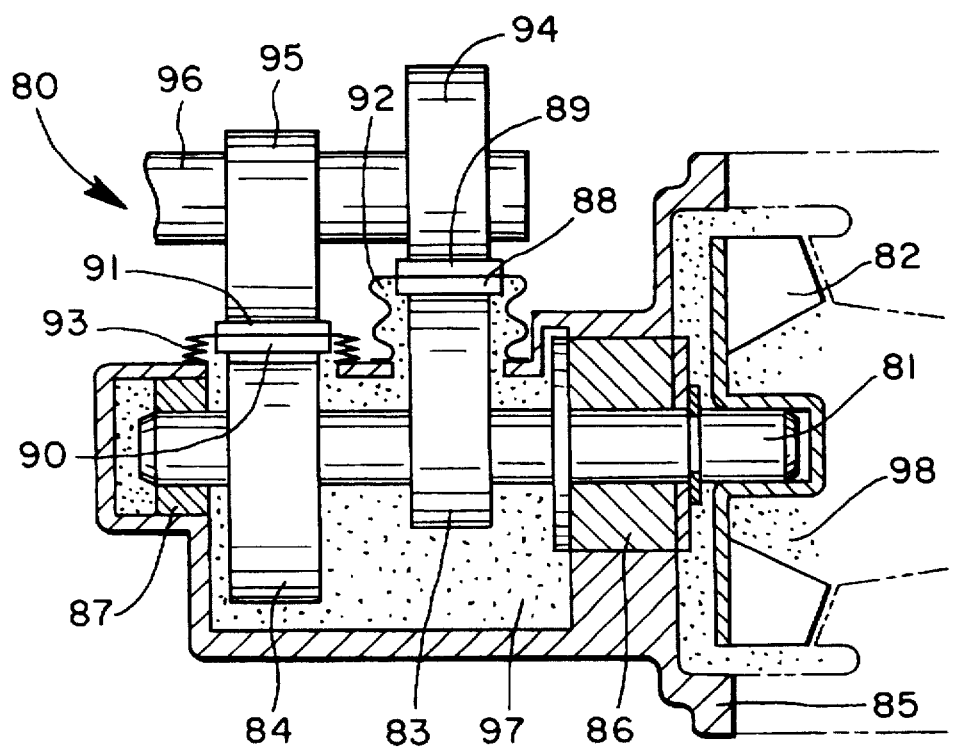
FIG. 13 is a sectional view illustrating a liquid pump according to a seventh embodiment of the present invention.

A seventh embodiment of the invention will now be described with reference to FIG. 13.

Here a liquid pump 80 has a bottomed cylindrical housing 85 which rotatably supports a pump shaft 81 inwardly of the housing via submerged sliding bearings 86 and 87. An impeller 82 is secured to the right end (as seen from the viewpoint of FIG. 13) of the pump shaft 81. Two cylindrical driven cams 83, 84 are secured to the pump shaft 81 and are disposed eccentrically with respect to the pump shaft 81. The driven cam 83 is arranged so as to have a phase difference of 180° relative to the driven cam 84. The exterior of the housing 85 is provided with a drive shaft 96, which serves as the driving unit, and two driving cams 94, 95. The drive shaft 96 is disposed in parallel with the pump shaft 81, and the driving cams 94, 95 are secured eccentrically to the drive shaft 96. The driving cam 94 is arranged to have a phase difference of 180° with respect to the driving cam 95. The driving cams 94, 95 abut against the driven cams 83, 84, respectively, through two openings provided in the housing 85 and via bellows 92, 93, respectively, which are resilient members. Plates 89 and 88, which consist of a wear-resistant material, are interposed between the opposing surfaces of the bellows 92 and driving cam 94 and between the opposing surfaces of the bellows 92 and driven cam 83, respectively. Similarly, plates 91 and 90, which consist of a wear-resistant material, are interposed between the opposing surfaces of the bellows 93 and driving cam 95 and between the opposing surfaces of the bellows 93 and driven cam 84, respectively. The bellows 92, 93 are secured to the housing 95 so as to liquid-tightly seal the two openings in the housing 85.

In accordance with this arrangement, the driving cams 94, 95 rotate, thereby alternately reciprocating the driven cams 83, 84, when the drive shaft 96 constituting the driving unit rotates. As a result, the pump shaft 81 is rotated to impel the liquid through the pump.

Part of the pressurized liquid fills the interior of the housing 85, in which the driven cams 83, 94 are installed, through the submerged sliding bearing 86. The heat produced by the sliding plates 88, 89, 90 and 91 is absorbed by the liquid, thereby cooling the plates. Since the liquid is sealed in by the bellows 92, 93, no liquid leaks from the housing 85.

It should be noted that the driven cams 83, 84 can be made to rotate smoothly if air is introduced beforehand into the interior of the housing 85 in which the driven cams 83, 84 are installed. In this case also, the driven cams 83, 84 are immersed in the liquid, as a result of which the heat from the plates 88, 89, 90 and 91 is given off through the driven cams 83, 84.

In the seventh embodiment, two pairs of cams are provided. However, three or more pairs of cams may be provided, in which case the pairs would be successively staggered in terms of phase.

Figure 14:
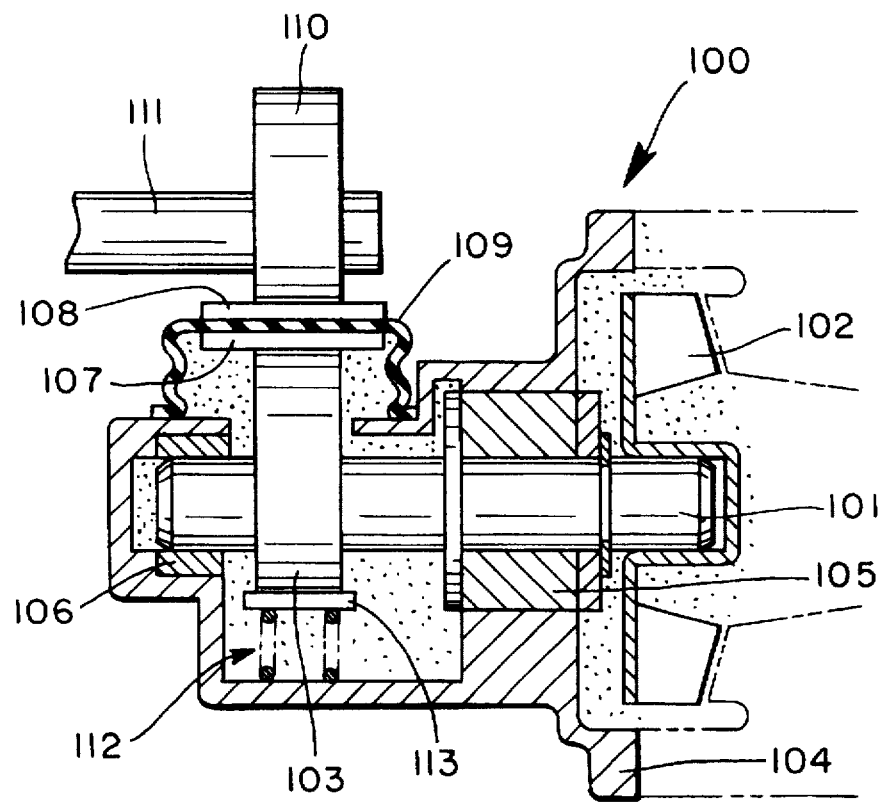
FIG. 14 is a sectional view illustrating a liquid pump according to an eighth embodiment of the present invention.
Figure 15:
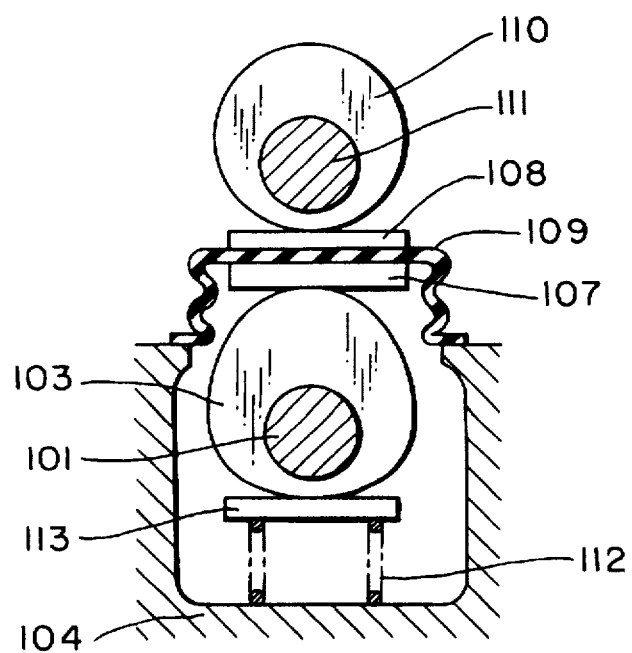
FIG. 15 is a sectional view showing another section of the liquid pump of FIG. 14.

An eighth embodiment of the invention is illustrated in FIGS. 14 and 15. Unlike the seventh embodiment, here only one pair of cams is provided.

Here a liquid pump 100 has a bottomed cylindrical housing 104 which rotatably supports a pump shaft 101 inwardly of the housing via submerged sliding bearings 105 and 106. An impeller 102 is secured to the right end (as seen from the viewpoint of FIG. 14) of the pump shaft 101. A cylindrical driven cam 103 is secured to the pump shaft 101 and is disposed eccentrically with respect to the pump shaft 101. The exterior of the housing 104 is provided with a drive shaft 111, which serves as the driving unit, and a driving cam 110. The drive shaft 111 is disposed in parallel with the pump shaft 101, and the driving cam 110 is secured eccentrically to the drive shaft 111. The driving cam 110 abuts against the driven cam 103 through an opening provided in the housing 104 and via a bellows 109, which is a resilient member. A wear-resistant plate 113 is placed on the side (the lower side in FIG. 14) of the driven cam 103 opposite the point of contact between driven cam 103 and driving cam 110. A spring 112 constituting biasing means is provided between the plate 113 and the housing 104 and urges the plate 113 toward the driven cam 103. Plates 108 and 107, which consist of a wear-resistant material, are interposed between the opposing surfaces of the bellows 109 and driving cam 110 and between the opposing surfaces of the bellows 109 and driven cam 103, respectively. The bellows 109 is secured to the housing 104 so as to liquid-tightly seal the opening provided in the housing 104.

In accordance with this arrangement, the driving cam 110 rotates when the drive shaft 111 constituting the driving unit rotates. The driven cam 103 is urged into abutting contact with the driving cam 110 at all times by the spring 112. As a result, the driven cam 103 also rotates as the driving cam 110 moves, thereby rotating the pump shaft 101 to impel the liquid through the pump.

A leaf spring or the like may be substituted for the spring 112 used as the biasing means in the eighth embodiment.

Figure 16:
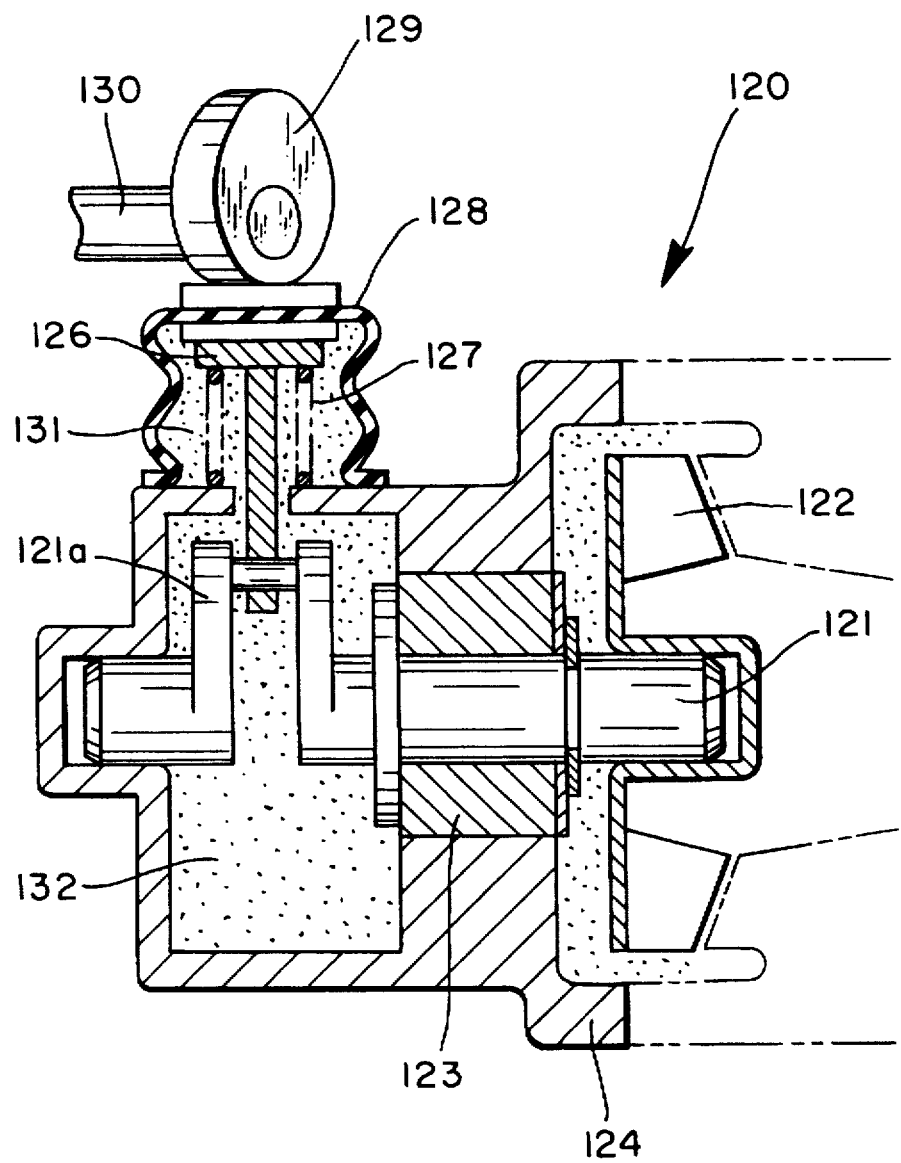
FIG. 16 is a sectional view illustrating a liquid pump according to a ninth embodiment of the present invention.

A ninth embodiment of the invention will now be described with reference to FIG. 16.

Here a liquid pump 120 has a bottomed cylindrical housing 124 which rotatably supports a pump shaft 121 inwardly of the housing via a submerged sliding bearing 123. An impeller 122 is secured to the right end (as seen from the viewpoint of FIG. 16) of the pump shaft 121. The pump shaft 121 is provided with a crank 121a on its left-hand side in the view of FIG. 16. A connecting rod 126 is rotatably supported on the crank 121a and penetrates a hole provided in the housing 124. The exterior of the housing 124 is provided with a drive shaft 130, which serves as the driving unit, and with a driving cam 129 secured eccentrically to the drive shaft 130. The driving cam 129 abuts against the connecting rod 126 via a bellows 128, which is a resilient member. A bellows 128 is secured to the housing 124 so as to liquid-tightly seal the opening provided in the housing 124. A spring 127 constituting biasing means is provided between the connecting rod 126 and the housing 124 and urges the connecting rod 126 toward the driving cam 129.

In accordance with this arrangement, the driving cam 129 rotates when the drive shaft 130 constituting the driving unit rotates. The connecting rod 126 is urged into abutting contact with the driving cam 129 at all times by the spring 127. As a result, the connecting rod 126 moves up and down in the view of FIG. 16 as the driving cam 129 moves. The crank 121 rotates in accordance with the up-and-down motion of the connecting rod 126, thereby rotating the pump shaft 121 to impel the liquid through the pump.

A leaf spring or the like may be substituted for the spring 127 used as the biasing means in the ninth embodiment.

Figure 17:
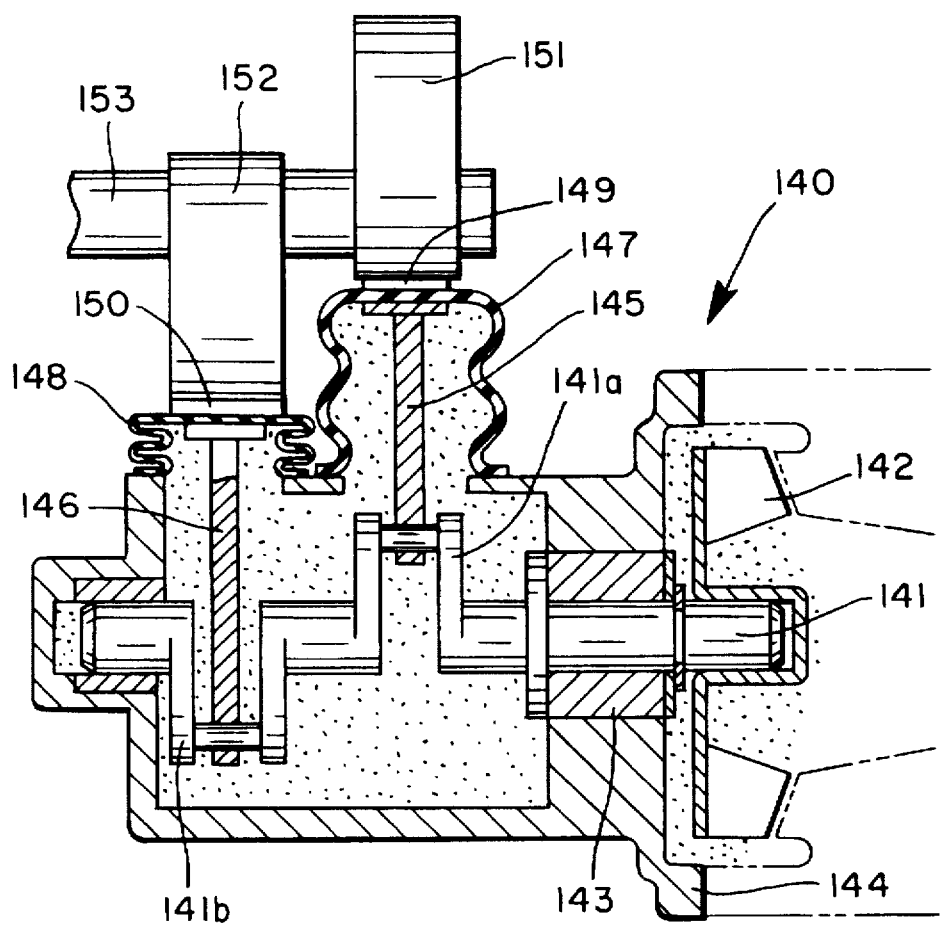
FIG. 17 is a sectional view illustrating a liquid pump according to a tenth embodiment of the present invention.

A tenth embodiment of the invention will now be described with reference to FIG. 17.

Here a liquid pump 140 has a bottomed cylindrical housing 144 which rotatably supports a pump shaft 141 inwardly of the housing 144 via a submerged sliding bearing 143. An impeller 142 is secured to the right end (as seen from the viewpoint of FIG. 17) of the pump shaft 141. The pump shaft 141 is provided with two cranks 141a, 141b on its left-hand side in the view of FIG. 17. Connecting rods 145, 146 are rotatably supported on the cranks 141, 141b, respectively, and penetrate holes provided in the housing 144. The exterior of the housing 144 is provided with a drive shaft 153, which serves as the driving unit, and with two driving cams 151, 152 secured eccentrically to the drive shaft 153. The driving cams 151 and 152 are secured to the drive shaft 153 at different phases. The driving cam 151 abuts against the connecting rod 145 via a bellows 147, which is a resilient member. Similarly, the driving cam 152 abuts against the connecting rod 146 via a bellows 148, which is a resilient member. The bellows 147, 148 are secured to the housing 144 so as to liquid-tightly seal the openings provided in the housing 144.

In accordance with this arrangement, the driving cams 151, 152 rotate when the drive shaft 153 constituting the driving unit rotates. The connecting rods 145, 146 are alternately reciprocated as the driving cams 151, 152 move. The cranks 141a, 141b rotate in accordance with the up-and-down motion of the connecting rods 145, 146, thereby rotating the pump shaft 141 to impel the liquid through the pump.

Figure 18:
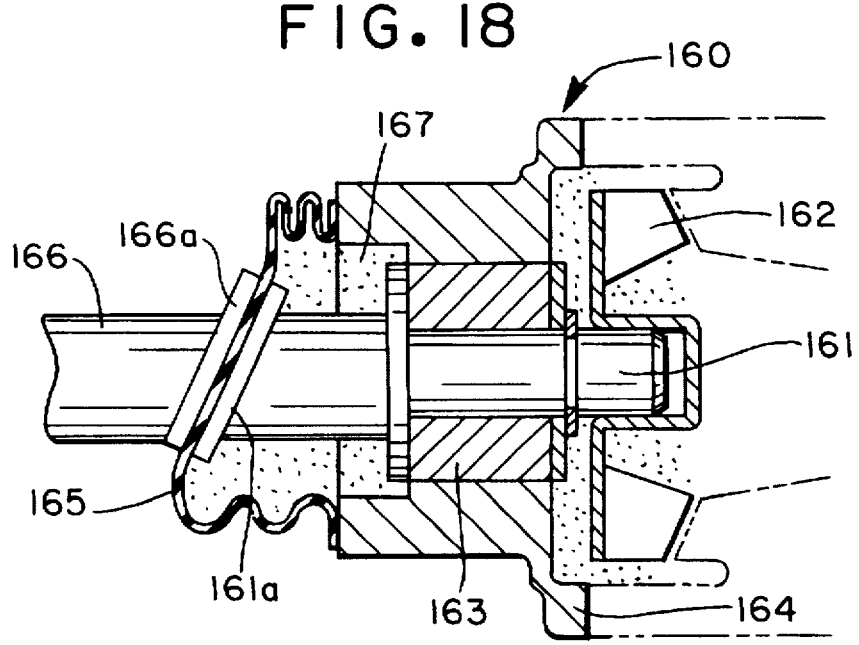
FIG. 18 is a sectional view illustrating a liquid pump according to an 11th embodiment of the present invention.

An 11th embodiment of the invention will now be described with reference to FIG. 18.

Here a liquid pump 160 has a cylindrical housing 164 which rotatably supports a pump shaft 161 inwardly of the housing via a submerged sliding bearing 163. An impeller 162 is secured to the right end (as seen from the viewpoint of FIG. 18) of the pump shaft 161. The left end (in FIG. 18) of the pump shaft 161 is provided with an inclined surface 161a. A drive shaft 166 comprising a driving unit is provided in coaxial relation to the pump shaft 161 and has a right end provided with an inclined surface 166a. The inclined surfaces 161a, 166a oppose each other and clamp between them a bellows 165, which is a resilient member. The inclined surfaces 161a, 166a are each formed so as to exhibit resistance to wear. The edge portion of the bellows 165 is secured to the edge portion of the housing 164 so as to effect sealing liquid-tightly.

In accordance with this arrangement, force from the inclined surface 166a acts upon the inclined surface 161a when the drive shaft 166 constituting the driving unit rotates, thereby rotating the pump shaft 161 so as to impel the liquid through the pump. Since the bellows 165 slides between the inclined surfaces 161a, 166a, the liquid is prevented from leaking.

Figure 19:
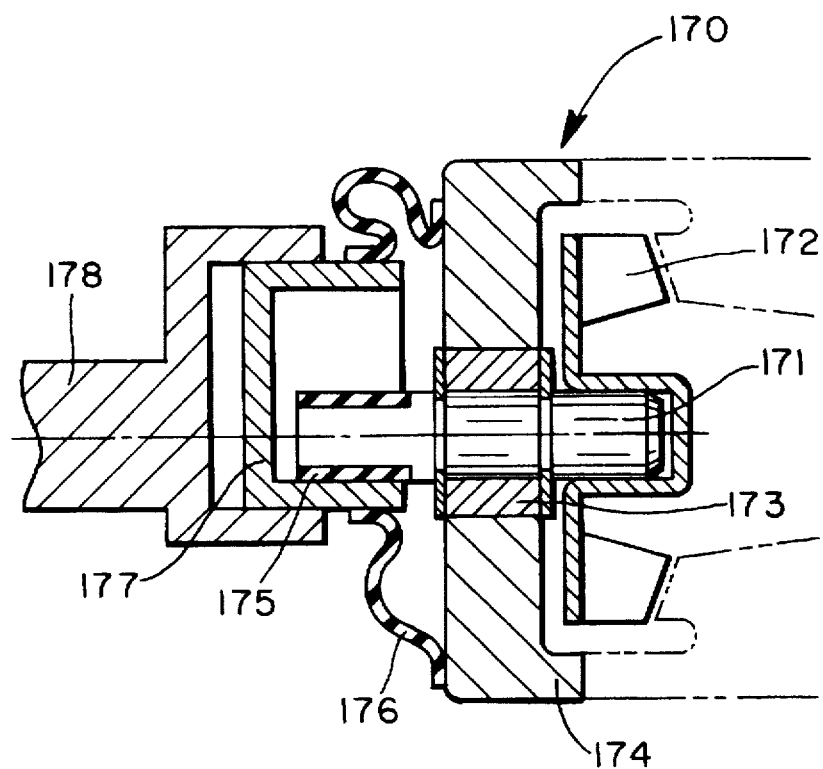
FIG. 19 is a sectional view illustrating a liquid pump according to a 12th embodiment of the present invention.

A 12th embodiment of the invention will be described with reference to FIG. 19.

Here a liquid pump 170 has a cylindrical housing 174 which rotatably supports a pump shaft 171 inwardly of the housing via a submerged sliding bearing 173. An impeller 172 is secured to the right end (as seen from the viewpoint of FIG. 19) of the pump shaft 171. The pump shaft 171 is equipped with a cylindrical resilient body 175 on its left end in the view of FIG. 19. A driving unit 178 arranged in coaxial relation to the pump shaft 171 is disposed on the left-hand side of the housing 174. The right-hand side of the driving unit 178 is formed to have a circular eccentric groove in which a cap 177 is rotatably supported. The cap 177 has a sleeve-shaped configuration that is open on its right-hand side in FIG. 19. A ring-shaped bellows 176 comprising a resilient member has its inner peripheral portion liquid-tightly fastened to the outer periphery of the cap 177. The outer periphery of the bellows 176 is liquid-tightly fastened to the housing 174. The inner periphery of the cap 177 is in abutting contact with the resilient body 175.

In accordance with this arrangement, rotation of the driving unit 178 relative to the housing 174 causes the eccentric groove of the driving unit 178 to revolve. This is accompanied by revolution of the cap 177, the rotation of which is checked by the bellows 176. In dependence upon the revolution of the cap 177, the resilient body 175 is acted upon by a force that rotates it relative to the cap, thereby rotating the pump shaft 171 so as to impel the liquid through the pump.

Figure 20:
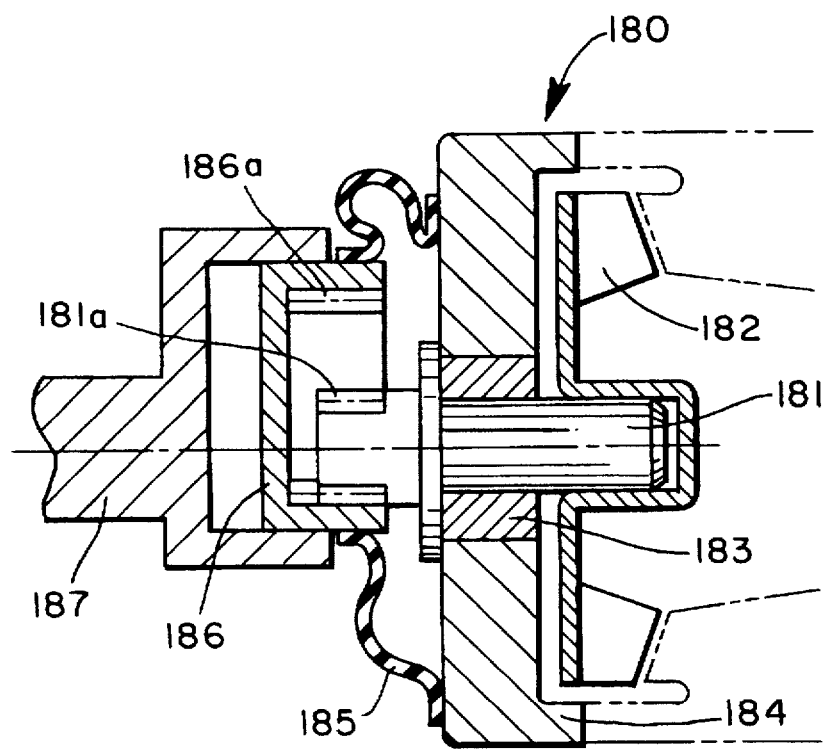
FIG. 20 is a sectional view illustrating a liquid pump according to a 13th embodiment of the present invention.
Figure 21:
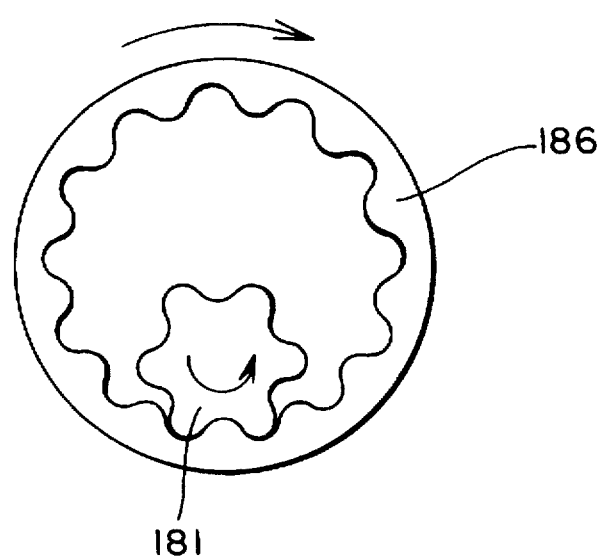
FIG. 21 is a sectional view showing another section of the liquid pump.

A 13th embodiment of the invention will now be described with reference to FIGS. 20 and 21.

Here a liquid pump 180 has a cylindrical housing 184 which rotatably supports a pump shaft 181 inwardly of the housing via a submerged sliding bearing 183. An impeller 182 is secured to the right end (as seen from the viewpoint of FIG. 20) of the pump shaft 181. The left end of the pump shaft 181 in FIG. 20 is formed to have a gear 181a. A driving unit 187 arranged in coaxial relation to the pump shaft 181 is disposed on the left-hand side of the housing 184. The right-hand side of the driving unit 187 is formed to have a circular eccentric groove in which a cap 186 is rotatably supported. The cap 186 has a sleeve-shaped configuration that is open on its right-hand side in FIG. 20. A ring-shaped bellows 185 comprising a resilient member has its inner peripheral portion liquid-tightly fastened to the outer periphery of the cap 186. The outer periphery of the bellows 185 is liquid-tightly fastened to the housing 184. The inner periphery of the cap 186 is formed to have a gear 186a meshing with the gear 181a.

In accordance with this arrangement, rotation of the driving unit 187 relative to the housing 184 causes the eccentric groove of the driving unit 178 to revolve. This is accompanied by revolution of the cap 186, the rotation of which is checked by the bellows 185. In dependence upon the revolution of the cap 186, the gear 181a is acted upon by a rotating force owing to its meshing engagement with the gear 186a. As a result, the pump shaft 181 rotates so that the liquid is impelled through the pump.

Figure 22:
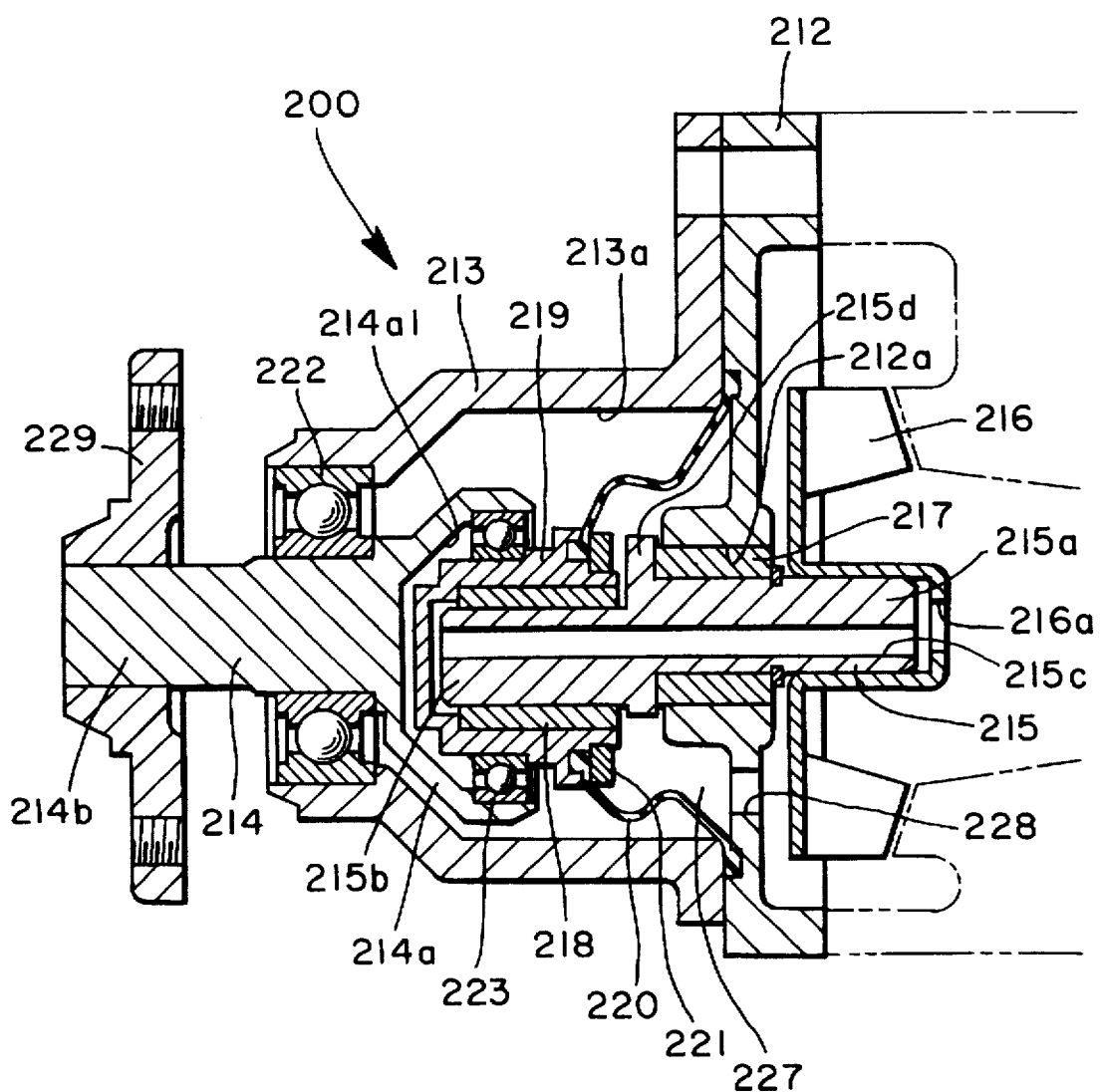
FIG. 22 is a sectional view showing a 14th embodiment of the present invention.

FIG. 22 shows a 14th embodiment of this invention. The liquid pump 200 shown in FIG. 22 has a body 212 adapted to be secured to an engine block and a cylindrical body 213 secured liquid-tightly to the body 212 by an outwardly extending flange to define one open end of its bore 213a. The body 212 is secured liquid-tightly to the engine block (not shown) by bolts (not shown). The body 212 has a radially inwardly extending flange provided with a hole 212a which is coaxial with the bore 213a of the body 213. A submerged sliding bearing 217 formed from e.g. a phenolic resin is press fitted in the hole 212a and has a bore in which a first shaft portion 215a formed toward one end of a pump shaft 215 is rotatably supported. The pump shaft 215 has an axially extending bore 215c. An impeller 216 is press fitted about the end of the first shaft portion 215a of the pump shaft 215, and is rotatable with the pump shaft 215 to direct a liquid from an intake port (not shown) to a discharge port. The impeller 216 has a communicating hole 216a which communicates the bore 215c of the pump shaft 215 with the intake port (not shown). The pump shaft 215 has a second shaft portion 215b formed toward the other end thereof situated in the bore 213a of the body 213, and separated by a flange 215d from the first shaft portion. The second shaft portion 215b has a longitudinal axis deviating or offset from that of the first shaft portion 215a by a distance which is equal to the diameter of the bore 215c of the pump shaft 215. The flange 215d of the pump shaft 215 is in sliding contact with the left end surface of the submerged sliding bearing 217 as viewed in the FIG. 22.

A driving member 214 has a shaft portion 214b supported rotatably by a rolling bearing 222 in the other open end of the bore 213a of the body 213. The shaft portion 214b of the driving member 214 has a longitudinal axis coinciding with that of the first shaft portion 215a of the pump shaft 215. The driving member 214 has at the other end thereof a cup-shaped portion 214a situated in the bore 213a of the body 213, and the cup-shaped portion 214a has a bore 214a1 having a longitudinal axis deviating or offset from that of the shaft portion 214b by a certain distance (equal to the diameter of the bore 215c of the pump shaft 215). A cap 219 defining a driven member according to this invention is rotatably supported by a rolling bearing 223 in the bore 214a1. The cap 219 is in the shape of a cylinder having a bottom closing one end thereof, and has an open end facing toward the impeller 216. The second shaft portion 215b of the pump shaft 215 is rotatably supported in the cap 219 by a cylindrical submerged sliding bearing 218 formed from e.g. a phenolic resin. The submerged sliding bearing 218 is press fitted in the cap 219 (or may alternatively be press fitted about the second shaft portion 215b of the pump shaft 215). A pulley seat 229 is secured to the end of the shaft portion 214b of the driving member 214 for securing a pulley (not shown), to which the power of an engine is transmitted by power transmitting means, such as a belt. The belt receiving portion of the pulley (not shown) has a belt center aligned axially with the rolling plane of the rolling bearing 222, so that no unbalanced load may act upon the rolling bearing 222.

An annular bellows (diaphragm) 220 defining an resilient member according to this invention has an inner edge fastened liquid-tightly to the outer periphery of the cap 219 by a ring member 221. The bellows 220 has an outer edge held liquid-tightly between the mating surfaces of the bodies 212 and 213. The flange of the body 212 which is situated behind the impeller 216 has a through hole 228 by which the outer circumferential portion (communicating with the discharge port) of a pump chamber formed between the body 212 and the cylinder block 211, and holding the impeller 216 is communicated with a space 227 formed between the bellows 220 and the flange of the body 212. The cap 219 has a bore communicating with the central portion of the pump chamber (communicating with the intake port) through the bore 215c of the pump shaft 215 and the communicating hole 216a of the impeller 216. A space separated from the space 227 by the bellows 220 is filled with air.

According to the arrangement as described above, the bore 214a1 of the cup-shaped portion 214a of the driving member 214 revolves about the longitudinal axis of its shaft portion 214b, if the driving member 214 is rotated by the pulley (not shown), but secured to the pulley seat 229, and the belt. As a result, the cap 219 likewise revolves about the longitudinal axis of the shaft portion 214, but its rotation on its own axis is restricted by the bellows 220. The revolution of the cap 219 causes the second shaft portion 215b of the pump shaft 215 to revolve about the same axis, and as the first shaft portion 215a is supported on the body 212 rotatably about the same axis, the pump shaft 215 rotates on its axis, while its second shaft portion 215b revolves about the same axis. As a result, the impeller 216 is rotated to impel the liquid from the intake port to the discharge port. A part of the liquid having a high pressure and existing in the outer circumferential portion of the pump chamber communicating with the discharge port flows into the space 227 through the hole 228, and while the liquid reaches the back of the impeller 216 along the sliding surfaces between the first shaft portion 215a and flange 215d of the pump shaft 215 and the submerged sliding bearing 217, it also reaches the central portion of the impeller 216 in the low pressure portion of the chamber communicating with the intake port along the sliding surfaces between the second shaft portion 215b of the pump shaft 215 and the submerged sliding bearing 218 and through the bore of the cap 219, the bore 215c of the pump shaft 215 and the communicating hole 216a of the impeller 216. Accordingly, no liquid having a high pressure is likely to circulate into the space 227 through the route as described above, fill it and exert an excessively high pressure on the bellows 220 during the operation of the liquid pump 200 as described above. Therefore, the inner and outer edges of the bellows 220 maintain a reliable seal between the bodies 212 and 213 and the cap 219 to perfectly prevent any of the liquid from leaking toward the driving member 214. Moreover, the liquid circulating as described above lubricates the sliding surfaces of the submerged sliding bearings 217 and 218 and cools them adequately.

Figure 23:
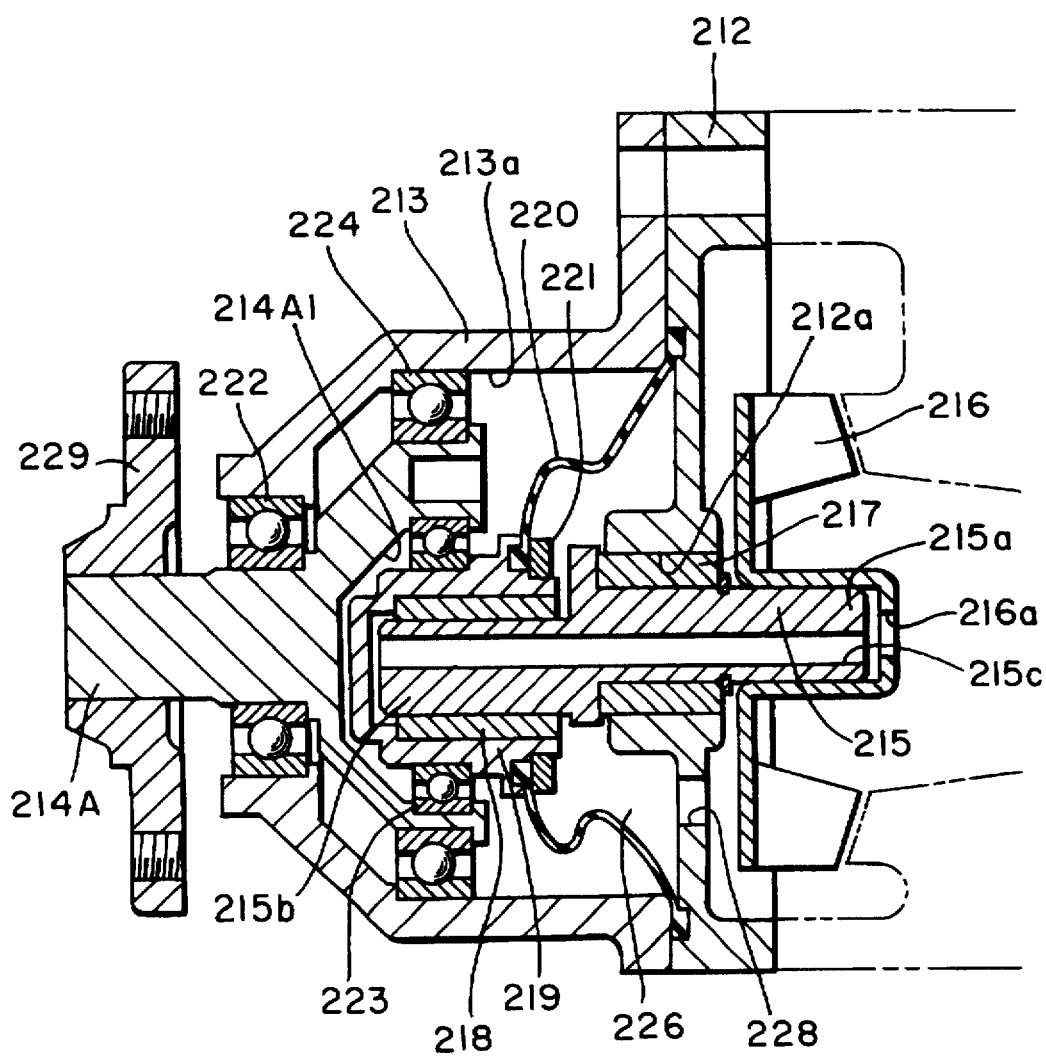
FIG. 23 is a sectional view showing a modified form of the 14th embodiment.

FIG. 23 shows a modified form of the 14th embodiment as described above. According to the modified form, a driving member 214A which is rotatably supported by a rolling bearing 222 on a body 213 has a cup-shaped portion defining a bore 214A1 having a longitudinal axis deviating from that of its shaft portion by a certain distance (equal to the diameter of the bore 215c of a pump shaft 215), and the cup-shaped portion has an outer periphery which is rotatably supported by a rolling bearing 224 in the bore 213a of the body 213. Although a pulley seat 229 is secured to the shaft portion of the driving member 214A to secure a pulley not shown, but having a belt receiving portion not shown, the center of its belt receiving portion (or its belt center) does not have to be axially aligned with the rolling plane of any rolling bearing, but can be set more freely, since the driving member 214A is rotatably supported on the body 213 at two axially spaced apart points by the two rolling bearings 222 and 224, respectively. Despite the absence of any such axial alignment, therefore, no unbalanced load is likely to bear upon the rolling bearings, but the bearings have a prolonged life. Moreover, as the driving member 214A is less likely to become inclined, and transmits a rotary force smoothly, other parts (submerged sliding bearings 217 and 218) have a prolonged life, too. The modified form is identical to the third embodiment in any other aspect of construction and operation, and as like reference numerals are used to denote like or common parts in FIGS. 22 and 23, no description of those parts is repeated.

Figure 24:
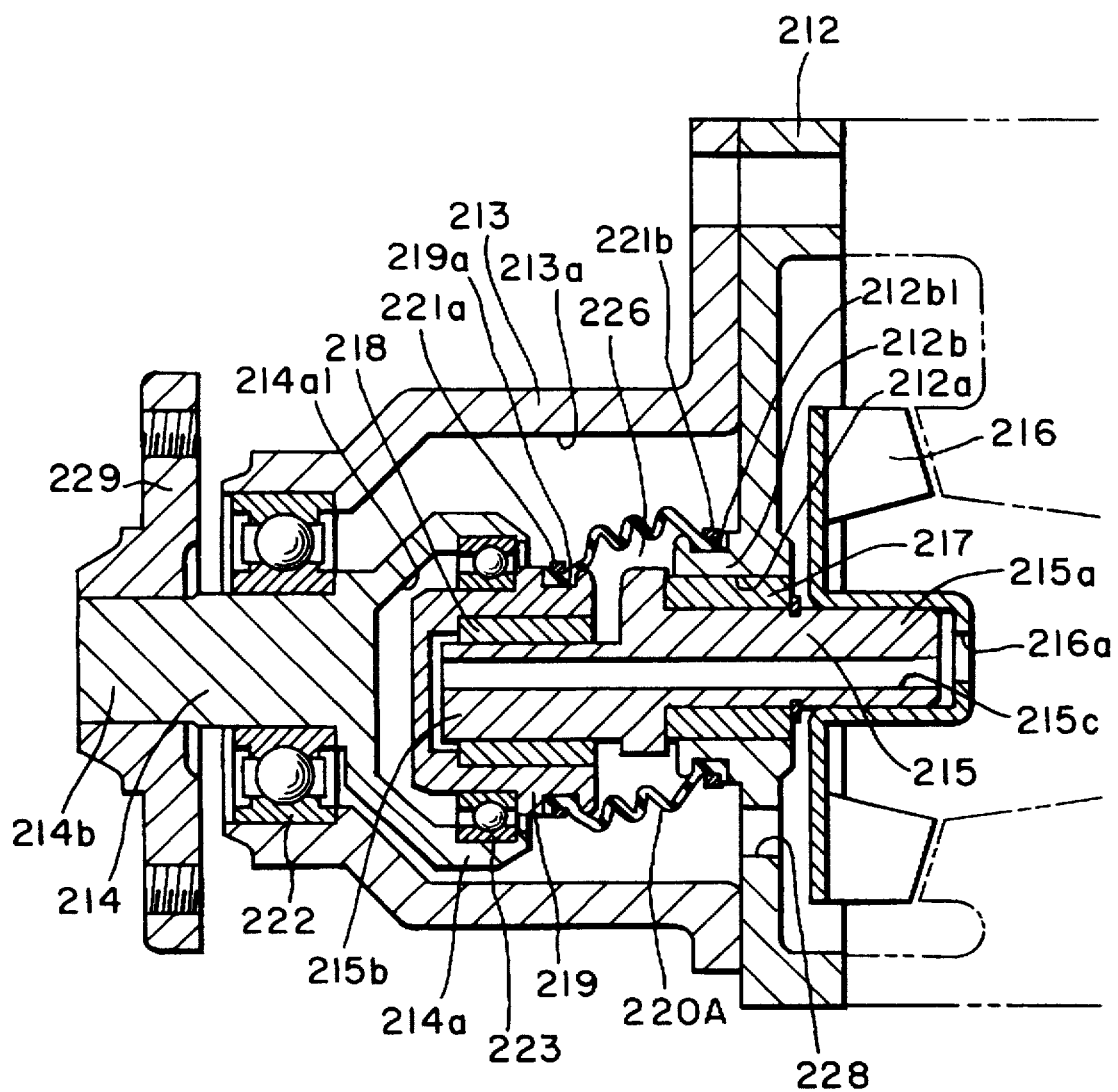
FIG. 24 is a sectional view showing another modified form of the 14th embodiment.

FIG. 24 shows another modified form of the 14th embodiment. According to this modified Form, a cap 219 has an annular groove 219a formed in the outer peripheral surface adjacent to its open end, and a cylindrical bellows (or diaphragm) 220A has one end secured liquid-tightly in the annular groove 219a by a ring member 221a. A body 212 has a cylindrical portion 212b formed on its flange and defining a bore 212a, and the cylindrical portion 212b has a part protruding into the bore 213a of a body 213 and having an annular groove 212b1 formed in its outer surface. The other end of the cylindrical bellows 220A is liquid-tightly secured in the annular groove 212b1 by a ring member 221b. The open end of the cap 219 and the cylindrical portion 212b of the body 212 to which the opposite ends, respectively, of the bellows 220A are liquid-tightly secured are preferably of substantially the same diameter. The bellows 220A defines a space 226 into which a liquid circulates, as in the case of the third embodiment. According to this modified form, the bellows 220A has a cylindrical shape with substantially the same diameter along its axis; therefore, it is not greatly deformed during the revolution of the cap 219, but can be prevented from interfering with the wall of the bore 213a of the body 213. Thus, the bellows 220A has a prolonged life. The modified form is identical to the third embodiment in any other aspect of construction and operation, and as like reference numerals are used to denote like or common parts in FIGS. 22 and 24, no description of those parts is repeated.

Figure 25:
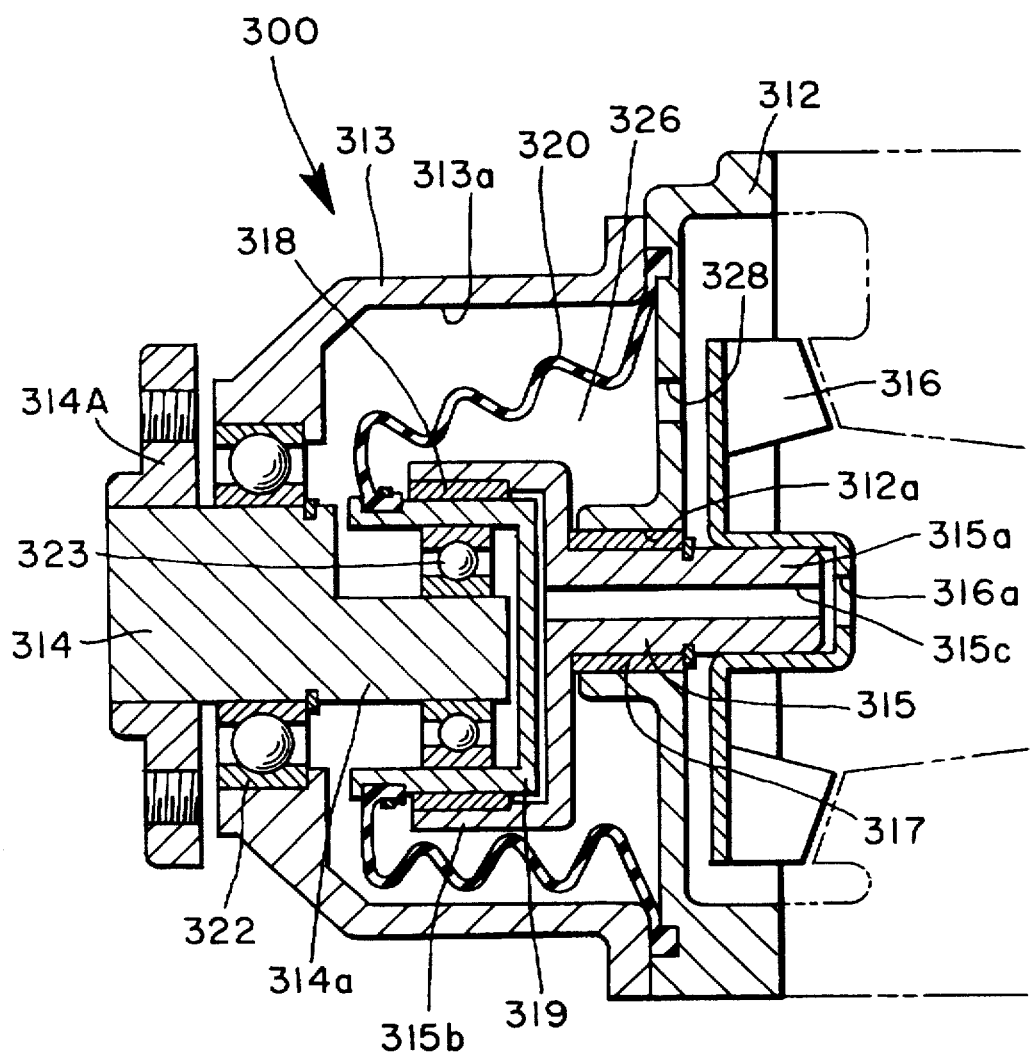
FIG. 25 is a sectional view showing a 15th embodiment of the present invention.

FIG. 25 shows a 15th embodiment of this invention. The liquid pump 300 shown in FIG. 25 has a body 312 and a cylindrical body 313 secured liquid-tightly to the body 312 by an outwardly extending flange formed about one open end of its bore 313a. The body 312 is liquid-tightly secured to a cylinder block not shown by bolts not shown. The body 312 has a radially inwardly extending flange having a bore 312a which is coaxial with the bore of the body 313. A cylindrical submerged sliding bearing 317 formed from e.g. a phenolic resin is press fitted in the bore 312a, and a pump shaft 315 has toward one end thereof a cylindrical reduced-diameter portion 315a supported rotatably in the bore of the submerged sliding bearing 317. An impeller 316 is press fitted on the end of the reduced diameter portion 315a, and is rotatable with the pump shaft 315 to direct a liquid from an intake port not shown to a discharge port. The impeller 316 has a communicating hole 316a which communicates the bore 315c of the reduced-diameter portion of the pump shaft 315 with the intake port. A diametrically enlarged cylindrical cam portion 315b is formed at the other end of the pump shaft 315 situated in the bore 313a of the body 313, and has a longitudinal axis deviating from that of the reduced-diameter portion 315a by a certain distance. The cam portion 315b has a side facing the flange of the body 312 and held in sliding contact with the left end of the submerged sliding bearing 317 as viewed in the drawing. A driving member 314 is rotatably supported by a rolling bearing 322 in the other open end of the bore 313a of the body 313. The driving member 314 is coaxial with the pump shaft 315. The driving member 314 has an eccentric shaft 314a formed at the right end as viewed in the drawing, and having a longitudinal axis deviating by a certain distance from that of the driving member 314, and a cap 319 defining a driven member according to this invention is rotatably supported by a rolling bearing 323 about the eccentric shaft 314a. The cap 319 is in the shape of a cylinder having a bottom and an open end facing the driving member 314, and the cam portion 315b of the pump shaft 315 is rotatably supported about the cap 319 by a cylindrical submerged sliding bearing 318 formed from e.g. a phenolic resin. The submerged sliding bearing 318 is press fitted on the cap 319 (or may alternatively be press fitted on the inner surface of the cam portion 315b of the pump shaft 315). The sliding bearing 318 is substantially in the same axial position with the rolling bearing 323. Therefore, it is possible to restrain the inclination of the cap 319 and the pump shaft 315 and prevent the failure of the sliding bearing. A pulley seat 314A is secured to the driving member 314 for securing a pulley not shown, but having a belt receiving portion to which the power of an engine is transmitted by power transmitting means, such as a belt. The belt receiving portion of the pulley not shown has a belt center which is axially aligned with the rolling plane of the rolling bearing 322, so that no unbalanced load may act upon the rolling bearing 322.

An annular bellows (diaphragm) 320 having a plurality of folds and defining an resilient member according to this invention has an inner end secured liquid-tightly by a ring member to the cap 319 adjacent to its open end. The outer end of the bellows 320 is liquid-tightly held between the mating surfaces of the bodies 312 and 313. The flange of the body 312 situated behind the impeller 316 has a through hole 328 by which the outer circumferential portion (which communicates with the discharge port) of a pump chamber formed between the body 312 and the cylinder block and holding the impeller 316 is communicated with a space 326 formed between the bellows 320 and the flange of the body 312. The cam portion 315b of the pump shaft 315 has a bore communicating with the central portion of the pump chamber (which communicates with the intake port) through the bore 315c of the reduced diameter portion 315a and the hole 316a of the impeller 316. A space separated from the space 326 by the bellows 320 is filled with air.

According to the structure as described above, the rotation of the driving member 314 by the pulley and belt not shown causes its eccentric shaft 314a to revolve about the longitudinal axis of the driving member 314. Thus, the cap 319 also revolves about the same axis, but its rotation on its own axis is restricted by the bellows 320. The revolution of the cap 319 causes the cam portion 315b of the pump shaft 315 to revolve about the same axis, but as the its reduced-diameter portion 315a is supported by the body 312 rotatably about its own axis, the pump shaft 315 rotates on its axis, while its cam portion 315b revolves about the same axis. As a result, the impeller 316 is rotated to direct the liquid from the intake port to the discharge port. Apart of the liquid having a high pressure and existing in the outer circumferential portion of the pump chamber communicating with the discharge port flows into the space 326 through the hole 328, and while the liquid reaches the back of the impeller 316 along the sliding surfaces between the reduced-diameter portion 315a of the pump shaft 315 and the submerged sliding bearing 317, it also reaches the central portion of the impeller 316 in the low pressure portion of the chamber communicating with the intake port along the sliding surfaces between the cam portion 315b of the pump shaft 315 and the submerged sliding bearing 318 and through the bore 315c of the reduced-diameter portion 315a and the communicating hole 316a of the impeller 316. Accordingly, no liquid having a high pressure is likely to circulate into the space 326 through the route as described above, fill it and exert an excessively high pressure on the bellows 320 during the operation of the liquid pump 300 as described above. Therefore, the inner and outer ends of the bellows 320 maintain a reliable seal between the bodies 312 and 313 and the cap 319 to prevent any of the liquid from leaking toward the driving member 314. Moreover, the liquid circulating as described above lubricates the sliding surfaces of the submerged sliding bearings 317 and 318 and cools them adequately.

Figure 26:
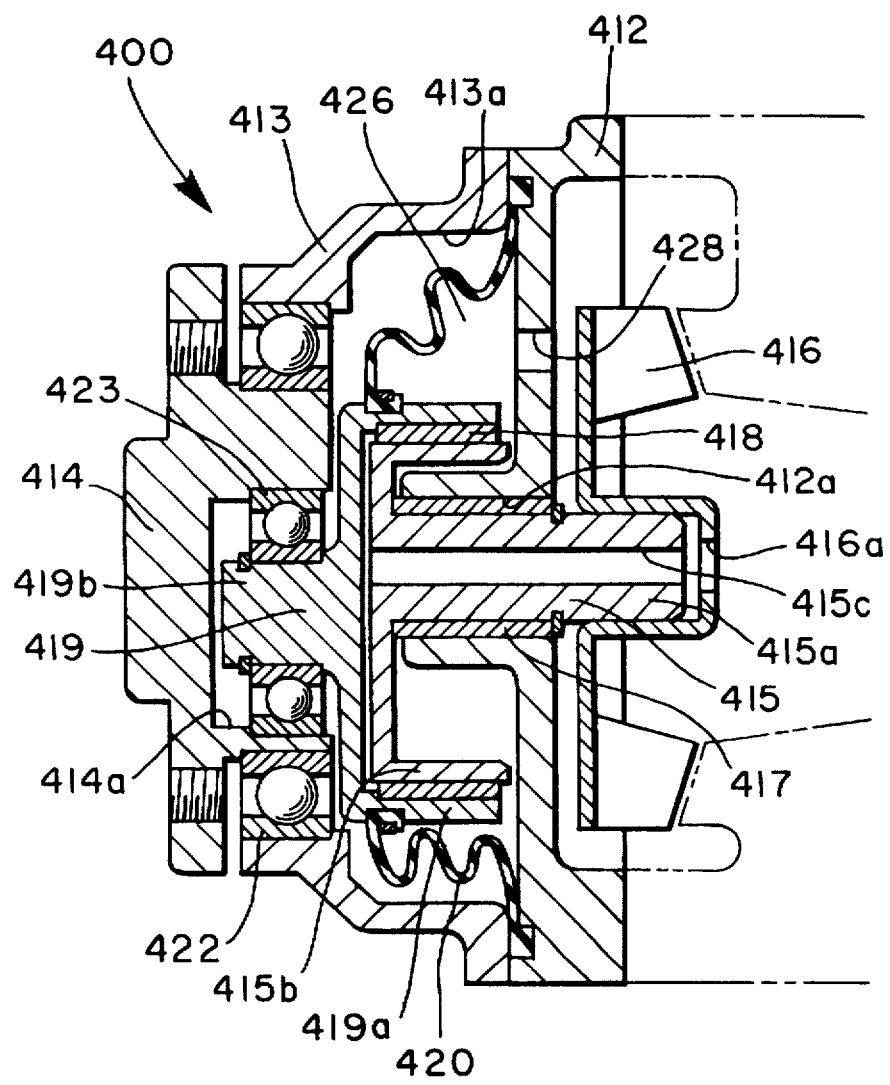
FIG. 26 is a sectional view showing a 16th embodiment of the present invention.

FIG. 26 shows a 16th embodiment of this invention. The liquid pump 400 shown in FIG. 26 has a body 412 and a cylindrical body 413 secured liquid-tightly to the body 412 by an outwardly extending flange formed at one open end of its bore 413a. The body 412 is liquid-tightly secured to a cylinder block by bolts not shown. The body 412 has a radially inwardly extending flange having a bore 412a which is coaxial with the bore 413a of the body 413. A cylindrical submerged sliding bearing 417 formed from e.g. a phenolic resin is press fitted in the bore 412a, and has a bore in which a cylindrical reduced-diameter portion 415a formed on a pump shaft 415 toward one end thereof is rotatably supported. An impeller 416 is press fitted about the end of the reduced-diameter portion 415a of the pump shaft 415, and is rotatable with the pump shaft 415 to direct a liquid from an intake port to a discharge port. The impeller 416 has a communicating hole 416a which communicates the bore 415c of the reduced-diameter portion of the pump shaft 415 with the intake port. A diametrically enlarged cylindrical cam portion 415b extending from the other end of the pump shaft 415 that is situated in the bore 413a of the body 413 surrounds the reduced-diameter portion 415a and has a longitudinal axis deviating from that of the reduced-diameter portion 415a by a certain distance. More specifically, the cam portion 415b comprises a disk extending radially outwardly from the left end of the reduced-diameter portion 415a as viewed in the drawing, and a cylinder extending from the outer edge of the disk toward the impeller 416 in parallel to the reduced-diameter portion, and the disk and cylinder have a longitudinal axis deviating from that of the reduced-diameter portion 415a by a certain distance. The bore 412a in the flange of the body 412 is formed in a shaft portion formed on the flange and extending into the cam portion 415a, and at its left end as viewed in the drawing, the sliding bearing 417 fitted in the bore 412a is in sliding contact with the disk forming the cam portion 415b.

A driving member 414 is rotatably supported by a rolling bearing 422 in the other open end of the bore 413a of the body 413. The driving member 414 is coaxial with the reduced-diameter portion of the pump shaft 415. The driving member 414 has an eccentric cavity 414a having a longitudinal axis deviating from that of the driving member 414 by a certain distance, and a cap 419 defining a driven member in the context of this invention has a shaft portion 419b formed at the left end thereof, as viewed in the drawing, and supported rotatably by a rolling bearing 423 in the eccentric cavity 414a. The rolling bearing 423 is in the same axial position with the rolling bearing 422. At its right end as viewed in the drawing, the cap 419 has a cup-shaped cylindrical portion 419a having an open end facing the flange of the body 412, and the cam portion 415b of the pump shaft 415 is rotatably supported in the cylindrical portion 419a by a cylindrical submerged sliding bearing 418 formed from e.g. a phenolic resin. The submerged sliding bearing 418 is press fitted in the cylindrical portion 419a of the cap 419 (or may alternatively be press fitted about the cap portion 415b of the pump shaft 415). The submerged sliding bearing 418 is substantially in the same axial position with the submerged sliding bearing 417, so that it is possible to prevent the inclination of the cap 419 and the pump shaft 415 and thereby the failure of the sliding bearings. This arrangement can also shorten the overall length of the pump. A seat for a pulley not shown formed an integral part of the driving member 414, and the power of an engine is transmitted by power transmitting means, such as a belt, to the pulley at its belt receiving portion. The belt receiving portion of the pulley not shown has a belt center which is axially aligned with the rolling plane of the rolling bearing 422, so that no unbalanced load may act upon the rolling bearing 422.

An annular bellows (diaphragm) 420 having a plurality of folds and defining an resilient member in the context of this invention has an inner end fastened liquid-tightly by a ring member to the outer surface of the cylindrical portion 419a of the cap 419 adjacent to the driving member 414. The outer end of the bellows 420 is liquid-tightly held between the mating surfaces of the bodies 412 and 413. The flange of the body 412 which is situated behind the impeller 416 has a through hole 428 by which the outer circumferential portion (which communicates with the discharge port) of a pump chamber formed between the body 412 and the cylinder block, and holding the impeller 416 is communicated with a space 426 formed between the bellows 402 and the flange of the body 412. The cam portion 415b of the pump shaft 415 has a cavity communicated with the central portion (communicating with the intake port) of the pump chamber though the bore 415c of the reduced-diameter portion 415a and the hole 416a of the impeller 416. A space separated from the space 426 by the bellows 420 is filled with air.

According to the arrangement as described above, the rotation of the driving member 414 by the pulley and belt not shown causes the eccentric cavity 414a to revolve about the longitudinal axis of the driving member 414. As a result, the cap 419 also revolves about the same axis, but its rotation on its own axis is restricted by the bellows 402. The revolution of the cap 419 causes the cam portion 415b of the pump shaft 415 to revolve about the same axis, but as its reduced-diameter portion 415a is supported on the body 412 rotatably about the same axis, the pump shaft 415 rotates on its own axis, while its cam portion 415b revolves about the same axis. As a result, the impeller 416 is rotated to impel the liquid from the intake port to the discharge port. A part of the liquid having a high pressure and existing in the outer circumferential portion of the pump chamber which communicates with the discharge port flows into the space 426 through the hole 428, and while the liquid reaches the back of the impeller 416 along the sliding surfaces between the reduced-diameter portion 415a of the pump shaft 415 and the submerged sliding bearing 417, it also reaches the central portion of the impeller 416 in the low pressure portion of the chamber communicating with the intake port along the sliding surfaces between the cam portion 415b of the pump shaft 415 and the submerged sliding bearing 418, and through the cavity, the bore 415c of the reduced-diameter portion 415a and the hole 416a of the impeller 416. Accordingly, no liquid having a high pressure is likely to circulate into the space 426 through the route as described above, fill it and exert an excessively high pressure on the bellows 420 during the operation of the liquid pump 400 as described above. Therefore, the inner and outer ends of the bellows 420 maintain a reliable seal between the bodies 412 and 413 and the cap 419 to prevent any of the liquid from leaking toward the driving member 414. The liquid circulating as described above lubricates the sliding surfaces of the submerged sliding bearings 417 and 418 and cools them adequately.

Thus, in accordance with the present invention as described above, sealing is effected liquid-tightly on the side of the driven unit to prevent the liquid from leaking to the side on which the driving unit is located.

The portions of the resilient member that slide against other components are cooled and any heat that evolves is absorbed, thereby improving the durability of the resilient member.

In addition, the cooling effect can be enhanced and a further improvement in the durability of the resilient member can be attained.

Torsion acting upon the resilient member is reduced, thereby providing the resilient member with greater durability.

The pump is made more compact since the eccentric groove is provided on the inner peripheral side of the pulley.

The driven cam rotates smoothly in conformity with the movement of the driving cam, thereby enabling more stable operation.

The rotational driving force of the driving cam and the rotational driving force of the driven cam that act upon the resilient member can be reduced. The result is a more durable resilient member.

Furthermore, the pump can be sealed perfectly against leakage of the liquid.

The rotational driving force of the driving cam that acts upon the resilient member can be reduced. The result is a more durable resilient member.

Furthermore, the pump shaft rotates smoothly, resulting in more stable operation.

Revolution of the cylindrical cap can readily be converted to rotation of the pump shaft, thus providing more stable operation.

As many apparently widely different embodiments of the present invention can be made without departing from the spirit and scope thereof, it is to be understood that the invention is not limited to the specific embodiments thereof except as defined in the appended claims.

What is claimed is:

1. A liquid pump comprising:

a housing adapted to be secured on a stationary member and having a flange with a hole;

a pump shaft rotatably supported on the flange and having an impeller at one end and an eccentric cam portion at the other end, the axis of the cam portion is being eccentric with respect to the pump shaft;

a cap having a cylindrical portion surrounding the cam portion and a shaft portion of which axis is coaxial with an axis of the cam portion and eccentric with respect to the axis of the pump shaft;

a driving member having an axis coaxial with the axis of the pump shaft and an eccentric cavity for rotatably receiving the shaft portion; and a resilient member disposed between the cylindrical portion and the housing.

2. A liquid pump comprising:

a housing adapted to be secured on a stationary member;

a pump shaft rotably supported inside said housing and having an impeller secured thereto for impelling a liquid through the pump;

an impeller secured to one end of the pump shaft for impelling a liquid through the pump;

a driven unit co-operatively positioned with said pump shaft for rotating said pump shaft, said driven unit having a driven cam with an axis that is eccentric relative to an axis of said pump shaft;

a driving unit coupled to an external force for rotating said driving unit and for transmitting a rotational torque to said driven unit said driving unit having a driving shaft that is rotatably supported on said housing and an eccentric portion with an axis that is eccentric relative to an axis of the driving shaft and coaxial with the axis of the cam of said driven unit; and a resilient member for effecting liquid-tight sealing between said driven unit and said driving unit.

3. The liquid pump according to claim 2, wherein said driven unit comprises a driven cam secured to said pump shaft eccentrically;

said driving unit comprises a pulley rotated by external power and having an inner peripheral side provided with an eccentric groove corresponding to an outer periphery of said driven cam; and said resilient member is provided between said driven cam and the eccentric groove of said pulley, thereby effecting sealing liquid-tightly on the side of the driven cam internally of said housing.

4. The liquid pump according to claim 3, wherein said driven cam comprises a semi-circular cam.

5,785,491

23

5. The liquid pump according to claim 1, wherein a liquid passageway is provided within said driven cam.

6. The liquid pump according to claim 5, wherein said liquid passageway is inclined.

7. The liquid pump according to claim 2, wherein said pump shaft and said driven cam have hollow interiors that are formed so as to be in communication with each other, said housing is provided with a flange so as to separate said housing into a first side on which the impeller is disposed and a second side on which the driven cam is disposed, and with a bearing, which is attached to the flange, for supporting said pump shaft so as to be rotatable relative to said housing, said driving unit includes a pulley rotated by external power, said driven unit is provided with a sleeve-shaped cap disposed between said driven cam and the eccentric groove of said pulley;

said resilient member is provided between the cap and the housing, thereby effecting liquid-tight sealing on the side of the pump internally of said housing; and said flange of said housing includes a hole defined such that the fist side on which the impeller is disposed and the second side on which the drives cam are communicatively connected.

8. The liquid pump according to claim 2, wherein said pump shaft is supported by a bearing that is supported on said housing, said driven unit includes a cap with a hollow portion formed so as to correspond to an outer configuration of the driven cam and to be coaxial with said driven cam, said pump shaft and said driven cam further having hollow interiors that are formed so as to be in communication with each other, said driving unit includes a pulley rotated by external power with the eccentric portion having a hollow portion corresponding to the cap, and said resilient member is provided between the cap and the housing, thereby effecting liquid-tight sealing on the side of the pump internally of said housing.

9. The liquid pump according to claim 8, wherein said cylindrical cam has the shape of a semicircular cylinder.

10. The pump according to claim 8, wherein said cap has an end portion provided with a cylindrically shaped groove of a size made to conform to a locus defined by a point on the cap when said cap revolves, and said cylindrical housing is provided with a rod-shaped portion extending into said cylindrically shaped groove.

11. The liquid pump according to claim 2, wherein said pump shaft is formed to have a cylindrical shape;

said driven unit is provided with a columnar eccentric cam secured eccentrically to said pump shaft and having an axially extending through-hole;

said housing is provided with a flange so as to separate the housing into a side on which the impeller is disposed and a side on which the eccentric cam is disposed, and with a bearing, which is attached to the flange, for supporting said pump shaft so as to be rotatable relative to said housing;

said driving unit comprises a pulley rotated by external power and having an inner peripheral side provided with an eccentric groove corresponding to an outer periphery of the eccentric cam;

said driven unit is provided with a sleeve-shaped cap disposed between the eccentric cam and the eccentric groove of said pulley;

24 said resilient member is provided between the cap and said housing, thereby effecting sealing liquid-tightly on the side of said pump shaft internally of said housing; and the flange of said housing is provided with a hole communicating the side on which the impeller is disposed and the side on which the cam is disposed.

12. The liquid pump according to claim 2, wherein said driven unit comprises a plurality of eccentric, columnar driven cams of different phases secured to said pump shaft;

said driving unit comprises a plurality of eccentric, columnar driving cams provided to correspond to said driven cams and rotated by external power; and said resilient members are provided between mutually corresponding ones of the drive cams and driven cams, thereby effecting sealing liquid-tightly on the sides of said driven cams internally of said housing.

13. The liquid pump according to claim 2, wherein said driven unit comprises an eccentric, columnar driven cam secured to said pump shaft;

said driving unit comprises an eccentric, columnar driving cam rotated by external power;

biasing means is provided between said housing and said driven cam for biasing said driven cam toward said driving cam; and said resilient member is provided between the driving cam and the driven cam, thereby effecting sealing liquid-tightly on the side of said driven cam internally of said housing.

14. The liquid pump according to claim 2, wherein said resilient member is provided with a wear-resistant plate at surfaces of contact between the driven cam and the driving cam.

15. The liquid pump according to claim 14, wherein said plate is molded as an integral part of said resilient member.

16. The liquid pump according to claim 2, wherein said driven unit comprises a crank secured to said pump shaft and a connecting rod supported on the crank;

said driving unit comprises an eccentric columnar driving cam rotated by external force; and said resilient member is provided between the driving cam and the connecting rod, thereby effecting sealing on the side of said connecting rod internally of said housing.

17. The liquid pump according to claim 16, wherein said resilient member is provided with a wear-resistant plate at surfaces of contact between the connecting rod and the driving cam.

18. The liquid pump according to claim 17, wherein said plate is molded as an integral part of the resilient member.

19. The liquid pump according to claim 16, wherein a plurality of each of the cranks, connecting rods and driving cams, successively offset in terms of phase, are provided.

20. The pump according to claim 2, wherein said driven unit is constituted by an inclined surface formed at one end of said pump shaft;

a drive shaft, one end of which is formed to have an inclined surface, and which is rotated by external power, is provided as said driving unit; and said resilient member is provided between the inclined surface of the drive shaft and the inclined surface of the pump shaft, thereby effecting sealing liquid-tightly on the side of said pump shaft internally of said housing.

21. The pump according to claim 2, wherein said driving unit comprises a drive shaft rotated by external power in coaxial relation to said pump shaft and having an eccentric groove eccentrically disposed with respect to said pump shaft;

said driven unit comprises an outer peripheral surface of one end of said pump shaft, and a cylindrical cap having an outer peripheral surface rotatably fitted into the eccentric groove of the drive shaft and an inner peripheral surface contacting the outer peripheral surface of said pump shaft; and said resilient member is provided between the cylindrical cap and the housing, thereby effecting sealing liquid-tightly on the side of said pump shaft internally of said housing.

22. The pump according to claim 21, wherein the inner peripheral surface of said cylindrical cap is provided with a first gear, and the outer peripheral surface of said pump shaft is provided with a second gear, said first and second gears meshing with each other.

23. The liquid pump according to claim 2, wherein the driven cam is formed integral with the pump shaft.

24. The liquid pump according to claim 7, wherein said cap is disposed inside the driven cam of the driven unit.

25. A liquid pump comprising:

a housing adapted to be secured on a stationary member;

a pump shaft rotably supported inside said housing and having an impeller secured thereto for impelling a liquid through the pump;

a driven unit provided inside said housing for rotating said pump shaft;

a driving unit coupled to external power; and a resilient member provided between said unit and said driving unit for effecting liquid-tight sealing between said driven unit and said driving unit on a side of the impeller and for transmitting force from said driving unit to said driven unit, wherein said driven unit includes a driven cam eccentrically secured to said pump shaft and having a liquid passageway provided therewithin, said driving unit includes a pulley rotated by external power and having an inner peripheral side with an eccentric groove corresponding to an outer periphery of said driven cam, and said resilient member is provided between said driven cam and the eccentric groove of said pulley, thereby effecting liquid-tight sealing on a side of the driven cam internally of said housing.

26. A liquid pump comprising:

a housing adapted to be secured on a stationary member;

a pump shaft rotably supported inside said housing and having an impeller secured thereto for impelling a liquid through the pump;

a driven unit provided inside said housing for rotating said pump shaft;

a driving unit coupled to external power; and a resilient member provided between said unit and said driving unit for effecting liquid-tight sealing between said driven unit and said driving unit on a first side of the impeller and for transmitting force from said driving unit to said driven unit, wherein said pump shaft is provided with a cylindrical reduced-diameter portion to which the impeller is secured, said driven unit is provided with a cylindrical cam portion eccentrically disposed with respect to the reduced-diameter portion, said reduced-diameter portion and cam portion having hollow interiors that are formed so as to be in communication with each other, said housing is provided with a flange so as to separate said housing into a first side on which the impeller is disposed and a second side on which the cam portion is disposed, and with a bearing, which is attached to the flange, for supporting the reduced-diameter portion of said pump shaft so as to be rotatable relative to said housing.

said driving unit includes a pulley rotated by external power and having an inner peripheral side provided with an eccentric groove corresponding to an outer periphery of the driven cam, said driven unit is provided with a sleeve-shaped cap disposed between the cam portion and the eccentric groove of said pulley, said resilient member is provided between the cap and the housing, thereby effecting liquid-tight sealing on a side of the pump internally of said housing, and said flange of said housing is provided with a hole defined such that the first side on which the impeller is disposed and the second side on which the cam portion are communicatively connected.

27. A liquid pump comprising:

a housing adapted to be secured on a stationary member;

a pump shaft rotably supported inside said housing and having an impeller secured thereto for impelling a liquid through the pump;

a driven unit provided inside said housing for rotating said pump shaft;

a driving unit coupled to external power; and a resilient member provided between said unit and said driving unit for effecting liquid-tight sealing between said driven unit and said driving unit on a first side of the impeller and for transmitting force from said driving unit to said driven unit, wherein said pump shaft is supported by a bearing that is supported on said housing.

said driven unit includes a cap provided with a hollow portion defined to correspond to an outer configuration of the driven cam and coaxial with the driven cam, said pump shaft and he driven cam having hollow interiors that are defined to be in communication with each other, said driving unit includes a pulley rotated by external power with the eccentric portion having a hollow portion defined to correspond with the cap, and said resilient member is provided between the cap and the housing, thereby effecting liquid-tight sealing on a side of the pump internally of said housing.

28. A liquid pump comprising:

a housing adapted to be secured on a stationary member;

a pump shaft rotably supported inside said housing and having an impeller secured thereto for impelling a liquid through the pump;

a driven unit provided inside said housing for rotating said pump shaft;

a driving unit coupled to external power; and a resilient member provided between said unit and said driving unit for effecting liquid-tight sealing between said driven unit and said driving unit on a first side of the impeller and for transmitting force from said driving unit to said driven unit, wherein said driving unit includes a drive shaft rotated by external power in coaxial relation to said pump shaft and having an eccentric groove eccentrically disposed with respect to said pump shaft, said driven unit includes an outer peripheral surface of one end of said pump shaft, and a cylindrical cap having an outer peripheral surface rotatably fitted into the eccentric groove of the drive shaft and an inner peripheral surface contacting the outer peripheral surface of said pump shaft, and said resilient member is provided between the cylindrical cap and the housing, thereby effecting liquid-tight sealing on a side of said pump shaft internally of said housing.

* * * * *